US007906730B2

(12) United States Patent
Atkinson et al.

(10) Patent No.: US 7,906,730 B2
(45) Date of Patent: Mar. 15, 2011

(54) GROUND SLEEVE HAVING IMPROVED IMPEDANCE CONTROL AND HIGH FREQUENCY PERFORMANCE

(75) Inventors: Prescott Atkinson, Nottingham, NH (US); Joseph George, Amherst, NH (US); Donald W. Milbrand, Jr., Bristol, NH (US)

(73) Assignee: Amphenol Corporation, Wallingford, CT (US)

( * ) Notice: Subject to any disclaimer, the term of this patent is extended or adjusted under 35 U.S.C. 154(b) by 53 days.

(21) Appl. No.: 12/240,577

(22) Filed: Sep. 29, 2008

(65) Prior Publication Data

US 2010/0081302 A1 Apr. 1, 2010

(51) Int. Cl.
*H02G 15/02* (2006.01)

(52) U.S. Cl. ........................................................ 174/78

(58) Field of Classification Search ................ 174/75 C, 174/78, 88 C; 439/98, 497
See application file for complete search history.

(56) References Cited

U.S. PATENT DOCUMENTS

| | | | | |
|---|---|---|---|---|
| 4,457,576 A * | 7/1984 | Cosmos et al. | .......... 439/607.47 |
| 4,836,791 A | 6/1989 | Grabbe et al. | |
| 4,889,500 A * | 12/1989 | Lazar et al. | .................. 439/579 |
| 6,217,372 B1 | 4/2001 | Reed | |
| 6,380,485 B1 | 4/2002 | Beaman et al. | |
| 6,394,839 B2 | 5/2002 | Reed | |
| 6,398,588 B1 | 6/2002 | Bickford | |
| 6,428,344 B1 | 8/2002 | Reed | |
| 6,482,017 B1 | 11/2002 | Van Doorn | |
| 6,616,482 B2 | 9/2003 | De La Cruz et al. | |
| 6,762,941 B2 | 7/2004 | Roth | |
| 6,776,645 B2 | 8/2004 | Roth et al. | |
| 6,823,587 B2 | 11/2004 | Reed | |
| 6,857,899 B2 | 2/2005 | Reed et al. | |
| 7,074,086 B2 | 7/2006 | Cohen et al. | |

OTHER PUBLICATIONS www.gore.com, Military Fibre Channel High Speed Cable Assembly, © 2008, printed Apr. 7, 2008, pp. 1-5.

Brian Beaman, High Performance Mainframe Computer Cables, Electronic Components and Technology Conference, 1997, pp. 911-917.

Microwave Theory and Techniques by Reich, Ordung, Krauss, and Skalink. Copyright 1965, Boston Technical Publishers Inc. pp. 182-191.

* cited by examiner

*Primary Examiner* — Chau N Nguyen
(74) *Attorney, Agent, or Firm* — Blank Rome LLP

(57) ABSTRACT

A waferized connector connects to two twinax cables. The connector includes a molded lead frame, ground sleeve, twinax cable, and overmolded strain relief. The lead frame is molded to retain a lead frame containing both differential signal pins and ground pins. Termination sections are provided at the rear of the lead frame to terminate each of the signal wires of the cables to respective signal lands. The ground sleeve has two general H-shape structures connected together by a center cross-support member. Each of the H-shaped structures having curved legs, each of which fits over the signal wires of one of the twinax cables. The wings of the ground sleeve are terminated to the ground lands of the lead frame and the drain wire of the cable is terminated to the ground sleeve to terminate the drain wire to a ground reference. The ground sleeve controls the impedance in the termination area of the cables, where the twinax foil is removed to expose the wires for termination to the lands. The ground sleeve also shields the cables to reduce crosstalk between themselves and adjacent wafers when arranged in a connector housing. A conductive slab member is formed over the sleeve to provide a capacitive coupling with the conductive foil of the signal cable.

66 Claims, 19 Drawing Sheets

GROUND SLEEVE HAVING IMPROVED IMPEDANCE CONTROL AND HIGH FREQUENCY PERFORMANCE

BACKGROUND OF THE INVENTION

1. Field of the Invention

The present invention relates to a ground sleeve. More particularly, the present invention is for a reference ground sleeve that controls impedance at the termination area of wires in a twinax cable assembly and provides a signal return path.

2. Background of the Related Art

Electrical cables are used to transmit signals between electrical components and are often terminated to electrical connectors. One type of cable, which is referred to as a twinax cable, provides a balanced pair of signal wires within a conforming shield. A differential signal is transmitted between the two signal wires, and the uniform cross-section provides for a transmission line of controlled impedance. The twinax cable is shielded and "balanced" (i.e., "symmetric") to permit the differential signal to pass through. The twinax cable can also have a drain wire, which forms a ground reference in conjunction with the twinax foil or braid. The signal wires are each separately surrounded by an insulated protective coating. The insulated wire pairs and the non-insulated drain wire may be wrapped together in a conductive foil, such as an aluminized Mylar, which controls the impedance between the wires. A protective plastic jacket surrounds the conductive foil.

The twinax cable is shielded not only to influence the line characteristic impedance, but also to prevent crosstalk between discrete twinax cable pairs and form the cable ground reference. Impedance control is necessary to permit the differential signal to be transmitted efficiently and matched to the system characteristic impedance. The drain wire is used to connect the cable twinax ground shield reference to the ground reference conductors of a connector or electrical element. The signal wires are each separately surrounded by an insulating dielectric coating, while the drain wire usually is not. The conductive foil serves as the twinax ground reference. The spatial position of the wires in the cable, insulating material dielectric properties, and shape of the conductive foil control the characteristic impedance of the twinax cable transmission line. A protective plastic jacket surrounds the conductive foil.

However, in order to terminate the signal and ground wires of the cable to a connector or electrical element, the geometry of the transmission line must be disturbed in the termination region i.e., in the area where the cables terminate and connect to a connector or electrical element. That is, the conductive foil, which controls the cable impedance between the cable wires, has to be removed in order to connect the cable wires to the connector. In the region where the conductive foil is removed, which is generally referred to as the termination region, the impedance match is disturbed.

SUMMARY OF THE INVENTION

Accordingly, it is an object of the invention to control the impedance in the termination region of a cable. It is a further object of the invention to match the impedance in the termination region of differential signal wires. It is still another object of the invention to match the impedance in the termination region of a twinax cable. It is yet another object of the invention to control the impedance in the termination region of a twinax cable as it is connected to leads of an electrical connector.

In accordance with these and other objectives, the present invention is a connector that is terminated to one or more twinax cables. The connector includes a plastic insert molded lead frame, ground sleeve, twinax cable, and integrated plastic over molded strain relief. The lead frame is molded to retain both differential signal pins and ground pins. Mating sections are provided at the rear of the lead frame to connect each of the signal wires of the cables to respective signal leads. The ground sleeve has two general H-shape structures connected together by a center cross-support member. Each of the H-shaped structures have curved legs, each of which fits over the signal wires of one of the twinax cables. The wings of the ground sleeve are welded to the ground leads and the drain wire of the cable is welded to the ground sleeve to terminate the drain wire to a ground reference. The ground sleeve controls the impedance in the termination area of the cables, where the twinax foil is removed to connect with the leads. The ground sleeve also shields the cables to reduce crosstalk between multiple wafers when arranged in a connector housing.

These and other objects of the invention, as well as many of the intended advantages thereof, will become more readily apparent when reference is made to the following description, taken in conjunction with the accompanying drawings.

BRIEF DESCRIPTION OF THE FIGURES

FIG. 3(*b*) is a view of the connector having an overmold.

FIGS. 4(*b*)-(*f*) illustrate the odd and even mode transmission improvement achieved by the present invention.

DETAILED DESCRIPTION OF THE PREFERRED EMBODIMENTS

Figure 1:
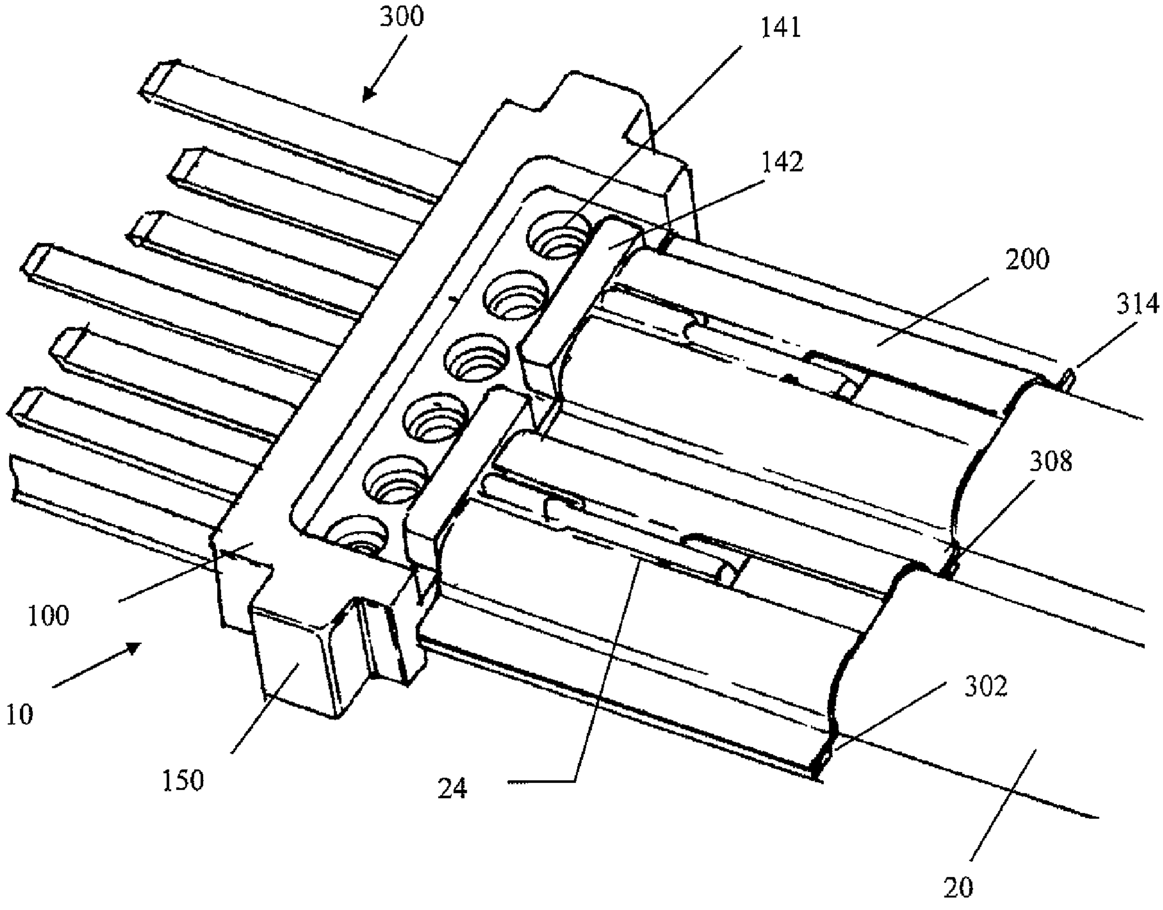
FIG. 1 is a perspective view of the connector having a ground sleeve in accordance with the preferred embodiment of the invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose.

Turning to the drawings, FIG. 1 shows a connector wafer 10 of the present invention to form a termination assembly used with cables 20. The connector 10 includes a plastic insert molded lead frame 100, ground sleeve 200, and pins 300. The lead frame 100 retains the pins 300 and receives each of the cables 20 to connect the cables 20 with the respective termination land regions 130, 132, 134, 136 (FIG. 3(*a*)). The ground sleeve 200 fits over the cables 20 to control the impedance in the termination area of the cables 20. The ground sleeve 200 also shields the cables 20 to reduce crosstalk between the wafers 10. In addition, the ground sleeve terminates the drain wires 24 of the cables 20 to maintain a ground reference.

Figure 2:
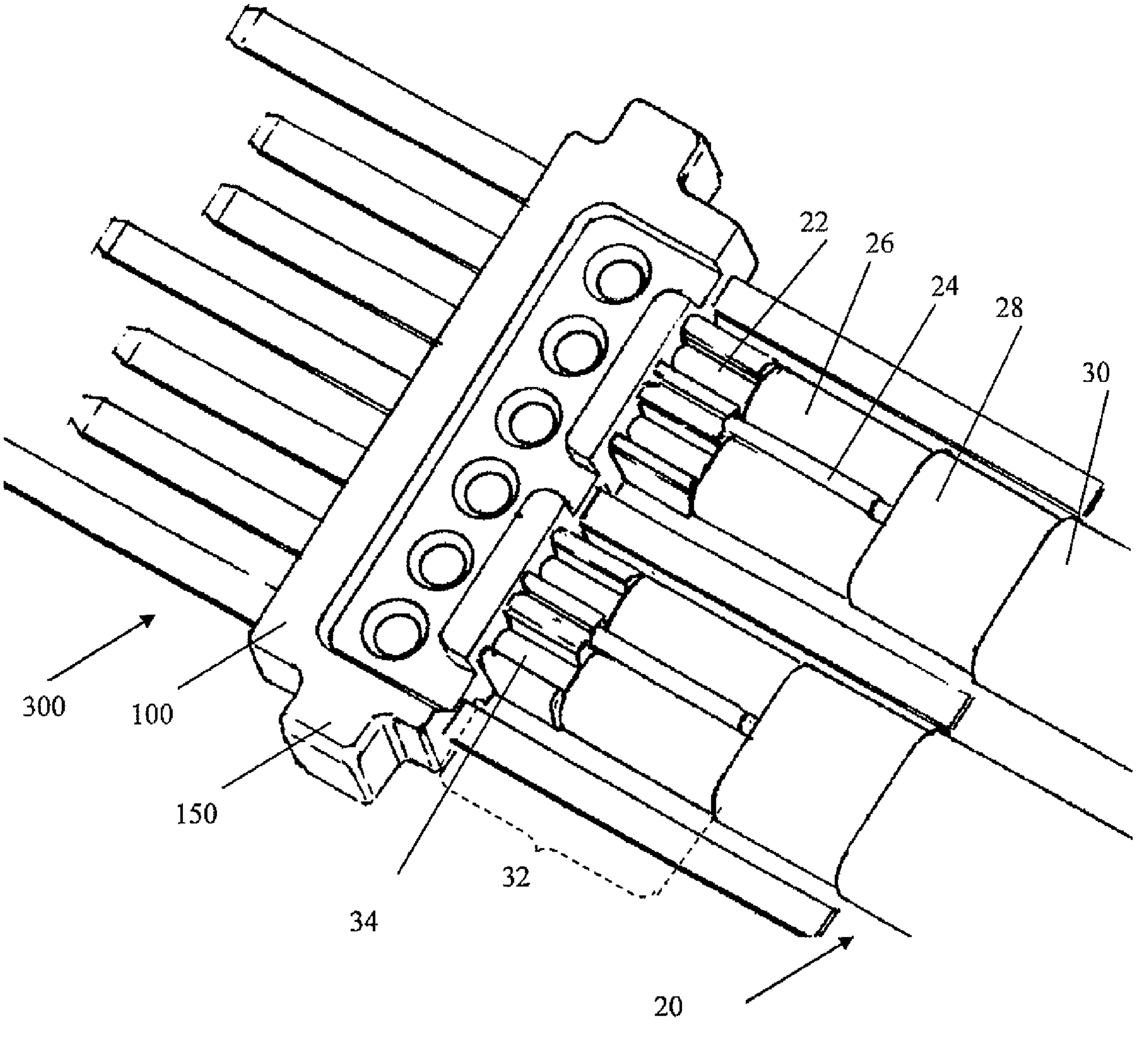
FIG. 2 is a perspective view of the connector of FIG. 1 with the ground sleeve removed to show a twinax cable terminated to the lead frame.

Referring to FIG. 2, the cables 20 are shown in greater detail. In the embodiment shown, two twin-axial cables, or twinax, are provided. Each of the cables 20 have two signal wires 22 which form a differential pair, and a drain wire 24 which maintains a ground reference with the cable conductive foil 28. The signal wires 22 are each separately surrounded by an insulated protective coating 26. The insulated wire pairs 22 and the non-insulated drain wire 24 are encased together in a conductive foil 28, such as an aluminized Mylar, which shields the wires 22 from neighboring cables 20 and other external influences. The foil 28 also controls the impedance of the cables 20 by binding the cross sectional electromagnetic field configuration to a spatial region. Thus, the twinax cables 20 provide a shielded signal pair within a conformal shield. A plastic jacket 30 surrounds the conductive foil 28 to protect the wires 22, which may be thin and fragile, from being damaged.

Referring to FIG. 2, the cables 20 are shown in greater detail. In the embodiment shown, two twin-axial cables, or twinax, are provided. Each of the cables 20 have two signal wires 22 which form a differential pair, and a drain wire 24 which maintains a ground reference with the cable conductive foil 28. The signal wires 22 are each separately surrounded by an insulated protective coating 26. The insulated wire pairs 22 and the non-insulated drain wire 24 are encased together in a conductive foil 28, such as an aluminized Mylar, which shields the wires 22 from neighboring cables 20 and other external influences. The foil 28 also controls the impedance of the cables 20 by binding the cross sectional electromagnetic field configuration to a spatial region. Thus, the twinax cables 20 provide a shielded signal pair within a conformal shield. A plastic jacket 30 surrounds the conductive foil 28 to protect the wires 22, which may be thin and fragile, from being damaged.

The air cavities provide for flexibility in controlling the transmission line characteristic impedance in the termination area. If smaller twinax wire gauges are used, the impedance will be increased. Additional plastic material may be added to fill the air cavities to lower the impedance. The H-shape is a feature used to accommodate the poorly controllable drain wire dimensional properties (e.g., mechanical properties including dimensional tolerances like drain wire bend radius, mylar jacket deformation and wrinkling, and electrical properties such as high frequency electromagnetic stub resonance and antenna effects, and the gaps can be used to tune the impedance if it is too low or high. Accordingly, this configuration provides for greater characteristic impedance control. The air cavities provide a mixed dielectric capability between the tightly-coupled transmission line conductors.

The termination region 110 also has two end members 122, 124. The inside walls of the end members 122, 124 are straight so that the signal wires 22 are easily received in the receiving sections 131, 133 and guided to the bottom of the receiving sections 131, 133 to connect with the lands of the pins 300. The outside surface of the end members 122, 124 are curved to generally conform with the shape of the insulated protective coating 26. Thus, when the signal wires 22 are placed in the receiving sections 131, 133, the termination regions 110 have a substantially similar shape as the portions of the cables 20 that have the insulated protective coating 26. In this way, the ground sleeve 200 fits uniformly over the entire end length of the cable 20 from the ends of the signal wires 22 to the end of the plastic jacket 30, as shown in FIG. 1.

Figure 3A:
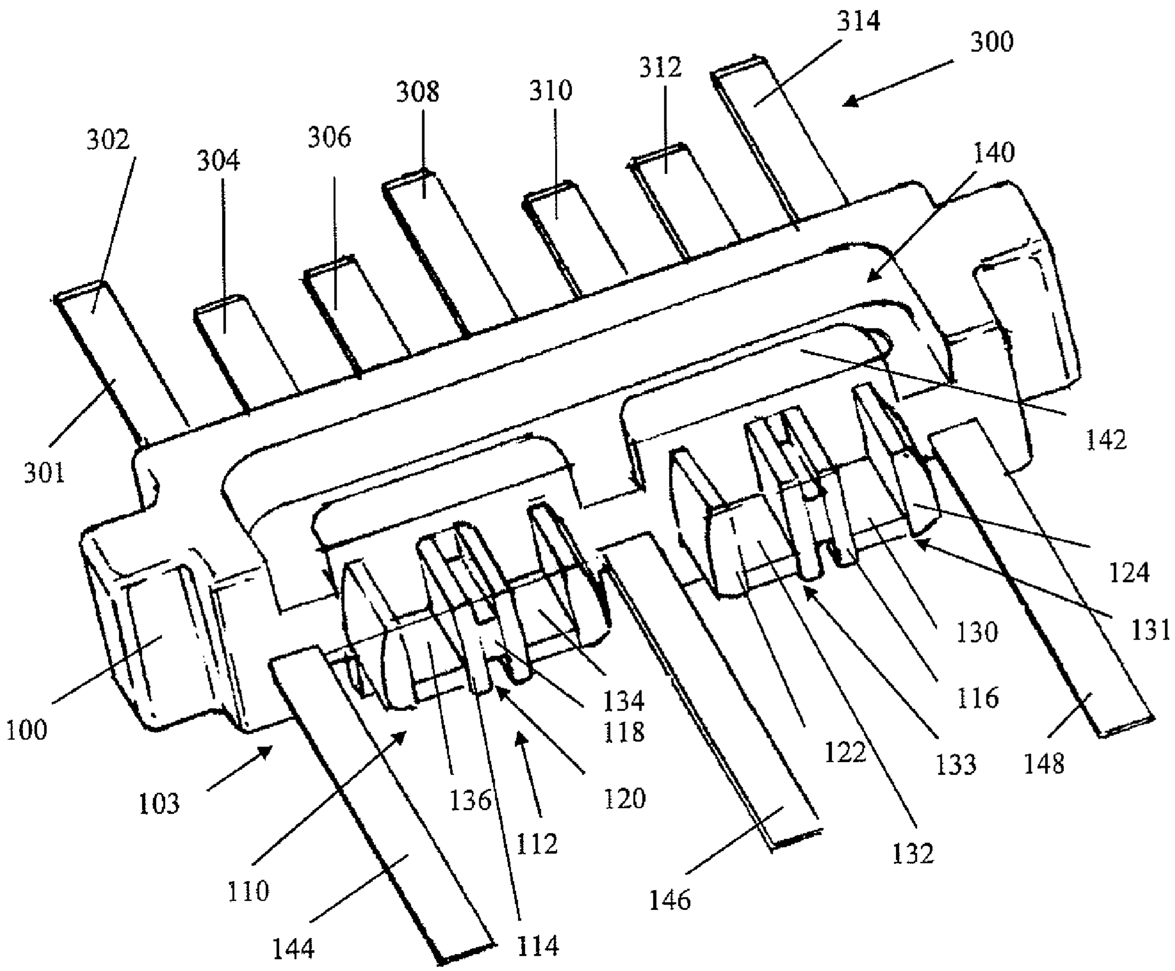
FIG. 3(*a*) is a perspective view of the connector of FIG. 1, with the ground sleeve and cables removed to show the lead frame having pins and termination land regions.
Figure 3B:
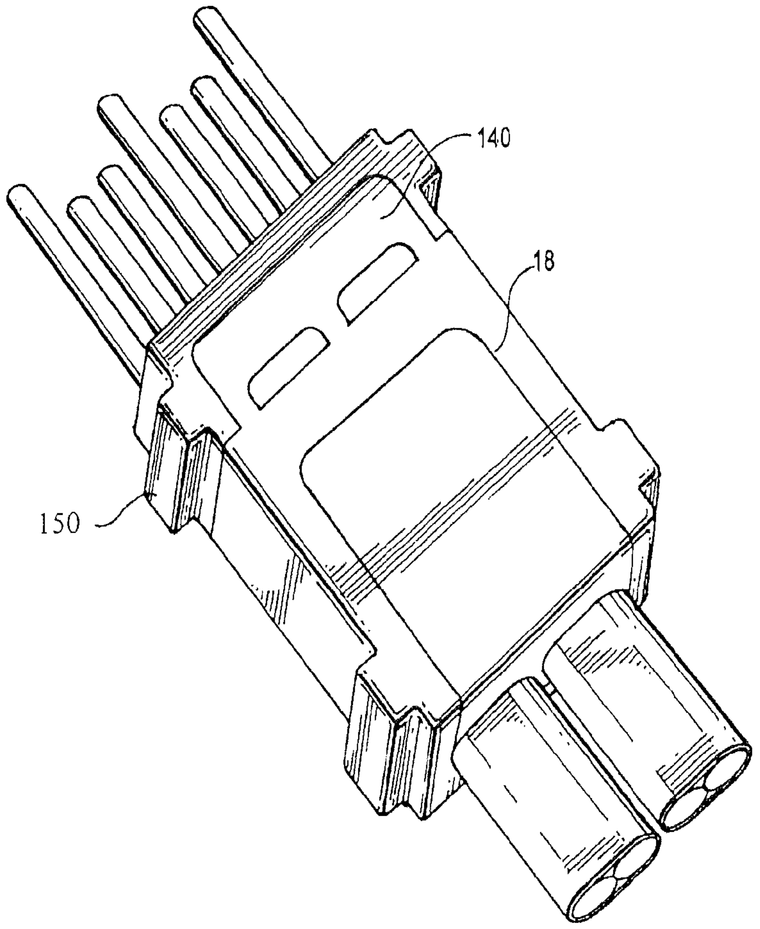
Figure 4A:
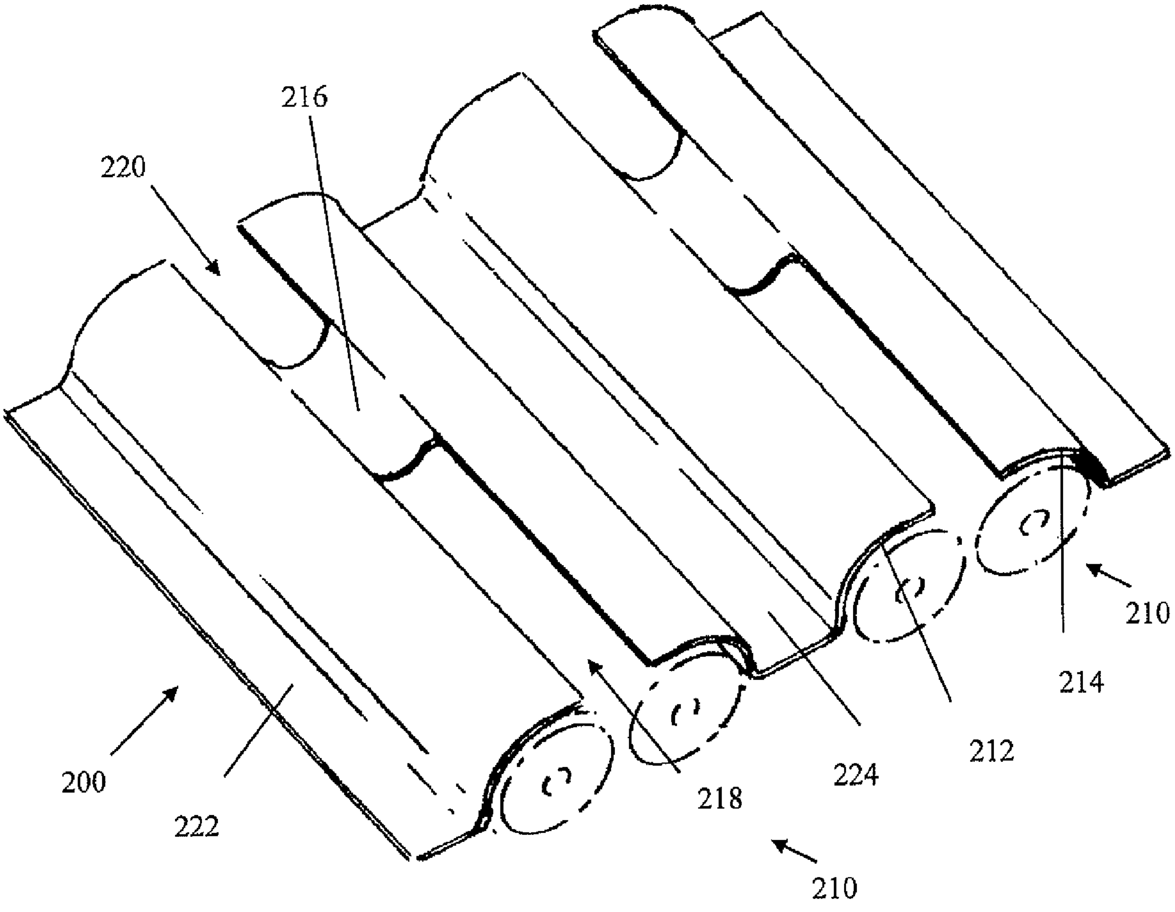
FIG. 4(*a*) is a perspective view of the ground sleeve.
Figure 4B:
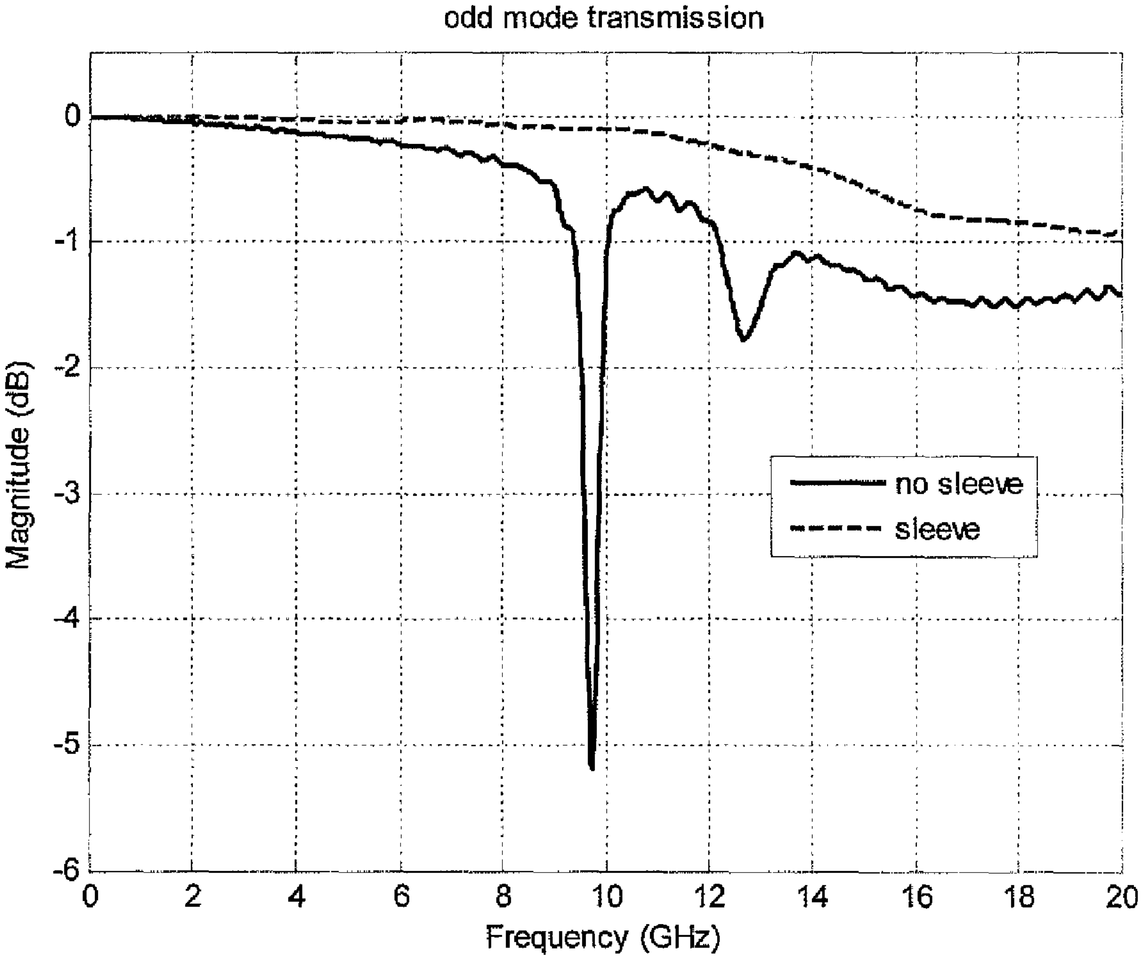
Figure 4C:
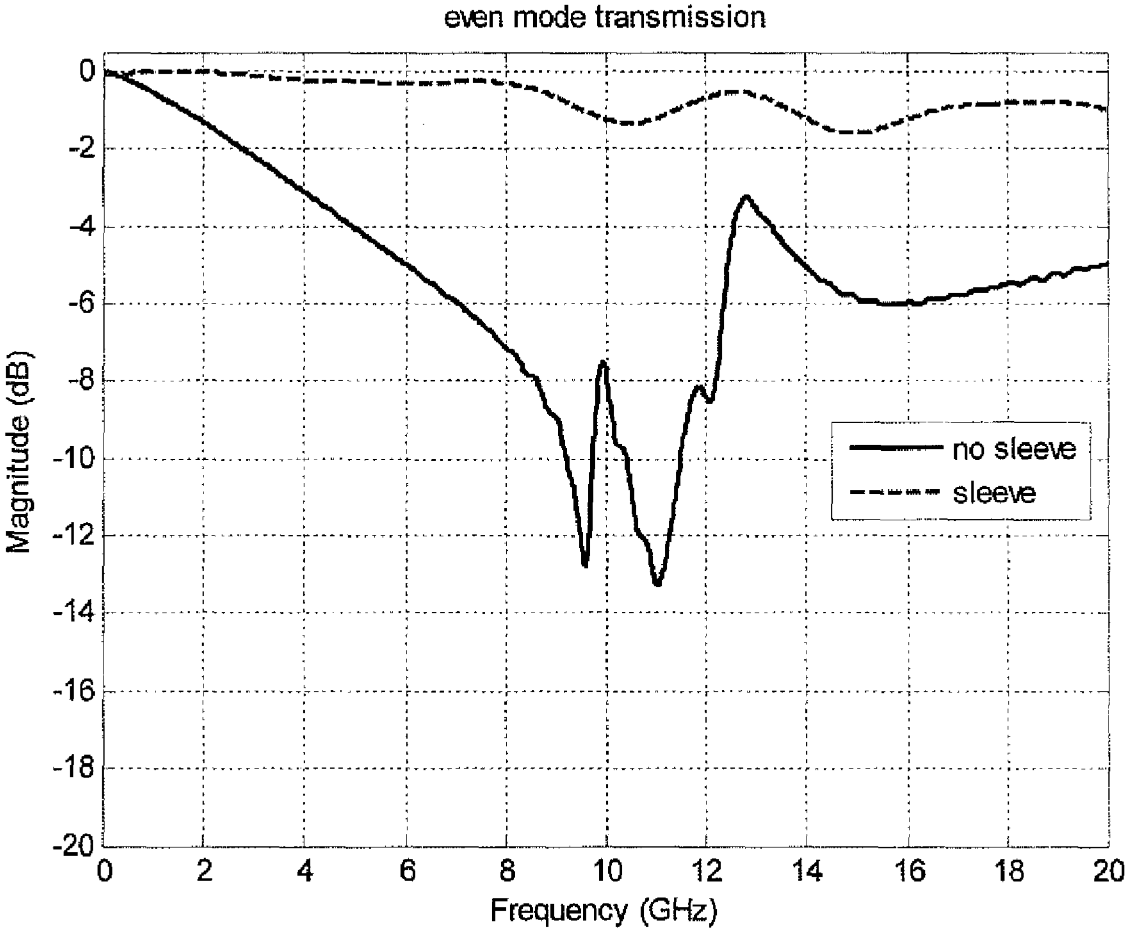
Figure 4D:
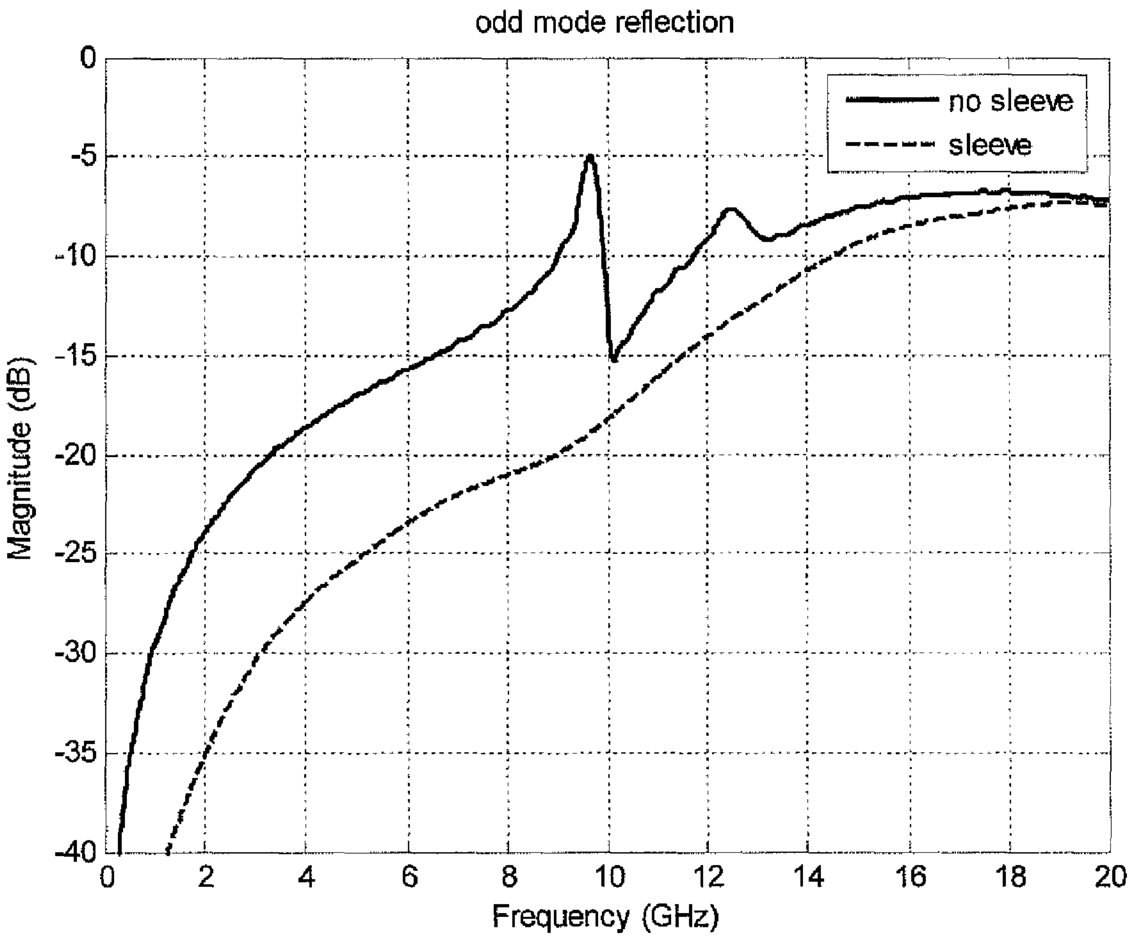
Figure 4E:
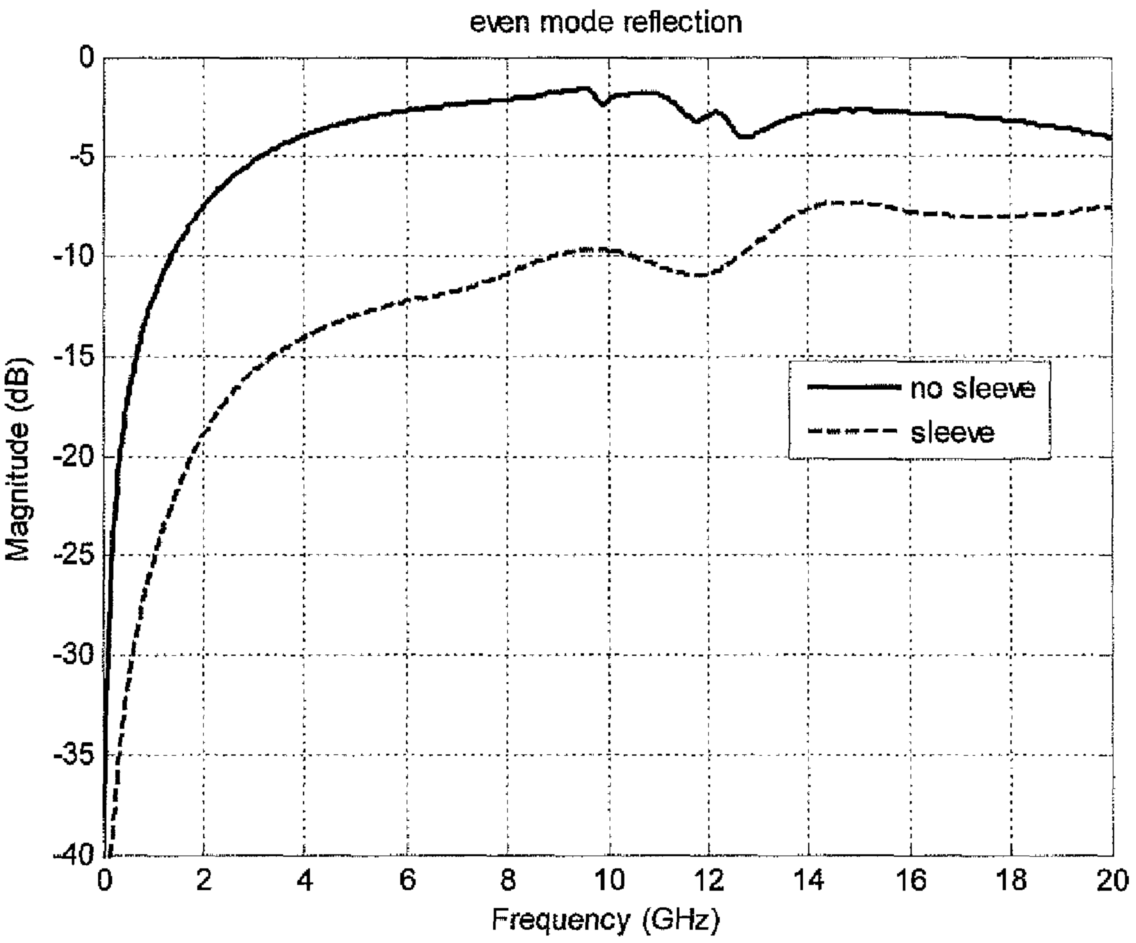
Figure 4F:
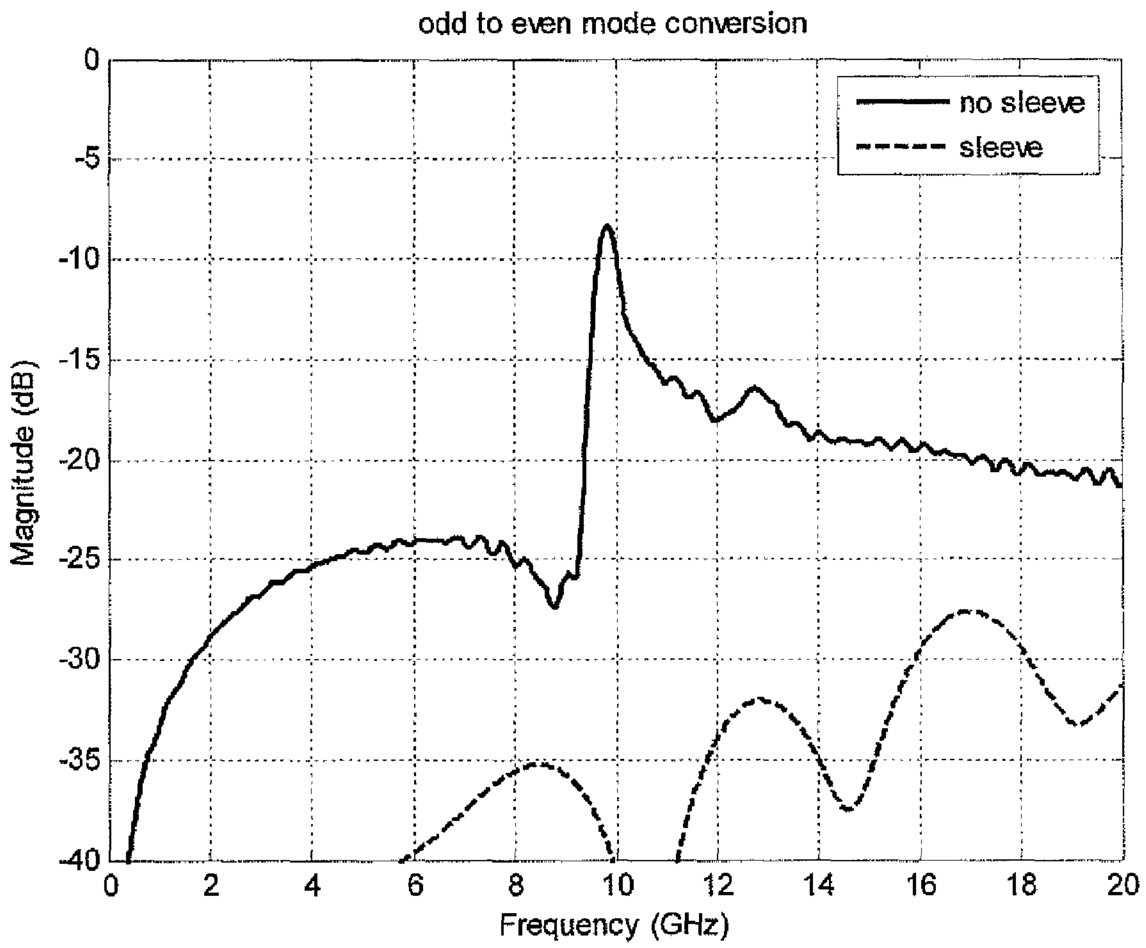
Figure 5:
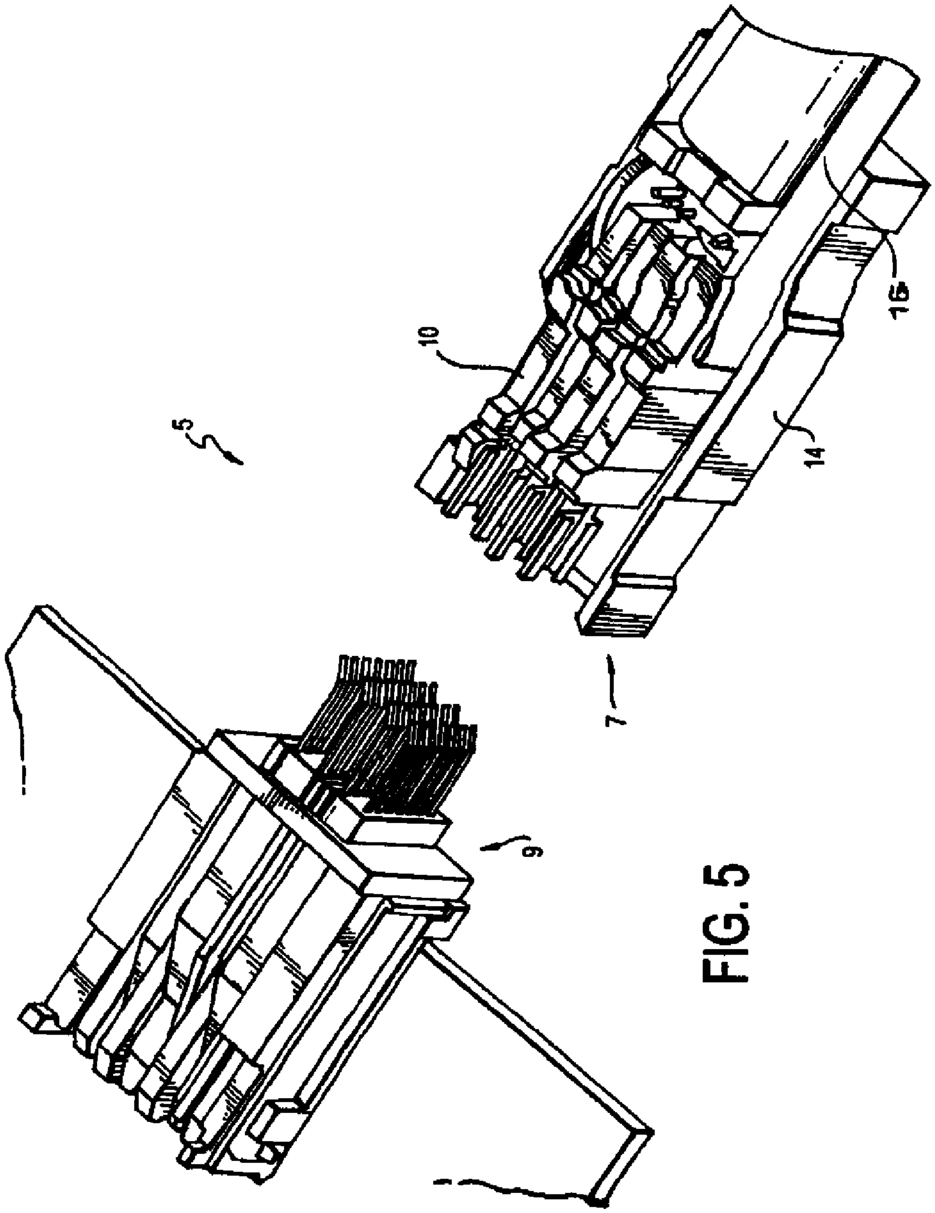
FIG. 5 is a perspective of a connection system having multiple wafer connectors of FIG. 1.

FIG. 3(*a*) also shows the pins 300 in greater detail. In the preferred embodiment, there are seven pins 300, including signal leads 304, 306, 310, 312, and ground leads 302, 308, 314. Each of the pins 300 have a mating portion 301 at one end and a termination region or attachment portions 103 at an opposite end. The mating portions 301 engage with the conductors or leads of another connector, as shown in FIG. 5. The termination regions 103 of the signal pins 304, 306, 310, 312, engage the signal wires 22 of the cables 20. The termination lands 103 of the ground pins 302, 308, 314 engage the ground sleeve 200. The neighboring signal lands 130, 132, 134, 136 form respective differential pairs and connect with the wires 22 of the cables 20.

The pins 300 are arranged in a linear fashion, so that the signal pins 304, 306, 310, 312 are co-planar with the ground leads 302, 308, 314. Thus, the signal pins 304, 306, 310, 312 form a line with the ground pins 302, 308, 314. In the preferred embodiment, the signal pins 304, 306, 310, 312 have an impedance determined by geometry and all of the pins 300 are made of copper alloy.

The pins 300 all extend through the lead frame 100. The lead frame 100 can be molded around the pins 300 or the pins 300 can be passed through openings in the lead frame 100 after the lead frame 100 is molded. Thus, the mating portions 301 of the pins 300 extend outward from the front of the lead frame 100, and the termination regions 103 extend outward from the rear surface of the lead frame 100. The pins also have an intermediate portion which connects the mating portion 301 and the termination portion 103. The intermediate portion is at least partially embedded in the lead frame 100.

The ground pins 302, 308, 314 are longer than the signal pins 304, 306, 310, 312, so that the ground pins 302, 308, 314 extend out from the front of the lead frame 100 further than the signal leads 304, 306, 310, 312. This provides "hot-plugability" by assuring ground contact first during connector mating and facilitates and stabilizes sleeve termination. The ground pins 302, 308, 314 extend out from the rear a distance equal to the length of the ground sleeve 200. Accordingly, the entire length of the wings of the ground sleeve 200 can be connected to the ground lands 144, 146, 148. The wings can be attached by soldering, multiple weldings, conductive adhesive, or mechanical coupling.

As further shown in FIG. 3(*a*), the center divider 112 and the end members 122, 124 define two receiving sections 131, 133. The receiving sections 131, 133 are formed by one of the leg members 114, 116 of the center divider 112, and an end member 122, 124. A land end 130, 132, 134, 136 of each of the signal pins 312, 310, 306, 304, respective, extends into each termination region to be situated between an end member 122, 124 and a respective leg member 114, 116. The ends 130, 132, 134, 136 of the signal pins 312, 310, 306, 304 are flush with the rear surface of the end members 122, 124 and the rear surface of the leg members 114, 116. The land ends 130, 132, 134, 136 are also positioned at the bottom of the termination region to form a termination platform within the receiving sections.

The lead frame 100 is insert molded and made of an insulative material, such as a Liquid Crystal Polymer (LCP) or plastic. The LCP provides good molding properties and high strength when glass reinforced. The glass filler has relatively high dielectric constant compared with polymers and provides a greater mixed dielectric impedance tuning capability. A channel 140 is formed at the top of the lead frame 100 to form a mechanical retention interlock with the overmold 18, as best shown in FIG. 3(*b*).

Stop members 142 are formed about the termination regions 110. The openings (shown in FIG. 1) are punched out during manufacturing to remove the bridging members used to prevent the pins 300 from moving during the process of molding the lead frame 100. The projections or tabs 150 on the side of the frame 100 form keys that provide wafer retention in the connector housing or backshell 14 (FIG. 5), and assures proper connector assembly. The latching of the backshell 14 is further described in U.S. Pat. No. 7,753,710, the contents of which are incorporated herein. The tabs 150 mate with organizer features in the connector housing 14 to help ensure proper alignment between the mating members of the board connector wafer and cable wafer halves.

Referring back to FIG. 2, the cable is prepared for termination with the lands 103 and the lead frame 100. The plastic jacket 30 is removed from the cables 20 by use of a laser that trims away the jacket 30. The laser also trims the foil 28 away to expose the insulated protective coating 26. The foil 28 is removed from the termination section 32 of the cable 20 so that the cable 20 can be connected with the leads 300 at the lead frame 100. The foil 28 is trimmed all the way back to expose the drain wire 24 and to prevent shorting between the foil and the signal wires. The insulation is then stripped away to expose the wire ends 34 of the cable 20. The drain wire 24 is shortened to where the insulation 26 terminates. The drain wire 24 is shortened to prevent any possible shorting of the drain wire to the exposed signal wires 22.

The cables 20 are then ready to be terminated with the lands 103 at the lead frame 100. The cables 20 are brought into position with the lead frame 100. The exposed bare signal ends 34 are placed within the respective receiving sections on top of the land ends 130, 132, 134, 136 of the signal pins 304, 306, 310, 312. Thus, the termination regions of the frame 100 fully receive the length of the signal wire ends 34. The bare wires 22 are welded or soldered to the lands 130, 132, 134, 136 of the signal leads 304, 306, 310, 312 to be electrically connected thereto. The drain wire 24 abuts up against the end of the center divider 116,118.

The lead frame 100 and sleeve 200 are configured to maintain the spatial configuration of the wires 22 and drain wire 24. The twinax cable 20 is geometrically configured so that the wires 22 are at a certain distance from each other. That distance along with the drain wire, conductive foil, and insulator dielectric maintains a characteristic and uniform impedance between the wires 22 along the length of the cable 20. The divider separates the wires 22 by a distance that is approximately equal to the thickness of the wire insulation 26. In this manner, the distance between the wires 22 stays the same when positioned in the receiving sections 131, 133 as when they are positioned in the cable 20. Thus, the lead frame 100 and sleeve 200 cooperate to maintain the geometry between the wires 22, which in turn maintains the impedance and balance of the wires 22. In addition, the sleeve 200 provides for a smooth, controlled transition in the termination area between the shielded twinax cable and open differential coplanar waveguide or any other open waveguide connector.

Furthermore, the ground sleeve 200 serves to join or common the separate ground pins 302, 308, and 314 (FIG. 3(*a*)) by conductive attachment in the regions 144, 146, and 148. This joining provides the benefit of preventing standing wave resonances between those ground pins in the region covered by the sleeve. Also, by reducing the longitudinal extent of the uncommoned portion of the ground pins, the sleeve 200 serves to increase the lowest resonant frequencies associated with that portion. A conductive element similar to the ground sleeve 200 may also be employed on the portion of the connector which attaches to a board, for the same purposes.

Turning to FIG. 4(*a*), a detailed structure of the ground sleeve 200 is shown. The sleeve 200 is a single piece element, which is configured to receive the two twinax cables 20. The sleeve 200 has two H-shaped receiving sections 210 joined together by a center support 224. The sleeve 200, the attachment portions 103 side of the ground leads 302, 308, 314, and the twinax wires constitute geometries that result in an electromagnetic field configuration matched to 100 ohms, or any other impedance. The H-shaped geometry provides a smooth transition between two 100 ohm transmission lines of different geometries and therefore having different electromagnetic field configurations in the cross-section, i.e. shielded twinax to open differential coplanar waveguide. The H-shaped geometry of the sleeve 200 also makes an electrical connection between the drain/conductive foil ground reference of the twinax to the ground reference of the differential coplanar waveguide connector. The differential coplanar waveguide is the connector transmission line formed by the connector lands/pins. The sleeve could be adapted for other connector geometries. The H-shaped sleeve 200 provides a geometry that allows the characteristic impedance of this transmission line section (termination area) to be controlled more accurately than just bare wires by eliminating the effects of the drain wire.

Each of the receiving sections 210 receive a twinax cable 20 and include two legs or curved portions 212, 214 separated by a center support member formed as a trough 216. The curved portions 212, 214 each have a cross-section that is approximately one-quarter of a circle (that is, 45 degrees) and have the same radius of curvature as the cable foil 28. The trough 216 is curved inversely with respect to the curved portions 212, 214 for the purpose of drain wire guidance. A wing 222 is formed at each end of the ground sleeve 200. The wings 222 and the center support member 224 are flat and aligned substantially linearly with one another.

The trough 216 does not extend the entire length of the curved portions 212, 214, so that openings 218, 220 are formed on either side of the trough 216. Referring back to FIG. 1, the rear opening 218 allows the drain wire 24 to be brought to the top surface of the sleeve 200 and rest within the trough 216. The trough 216 is curved downward so as to facilitate the drain wire 24 being received in the trough 216. In addition, the downward curve of the trough 216 is defined to maintain the geometry between the drain wire 24 and the signal wires 22, which in turn maintains the impedance and symmetrical nature of the termination region. Though the opening 218 is shown as an elongated slot in the embodiment of FIG. 4(*a*), the opening 218 is preferably a round hole through which the drain wire 24 can extend. Accordingly, the back end of the sleeve 200 is preferably closed, so as to eliminate electrical stubbing.

The lead opening 220 allows the ground sleeve 200 to fit about the top of the center divider 212, so that the drain wire 24 can abut the center divider 112 (though it is not required that the drain wire 24 abut the divider 112). By having the drain wire 24 connect to the top of the sleeve 200, the drain wire is electrically commoned to the system ground reference. The drain wire 24 is fixed to the trough 216 by being welded, though any other suitable connection can be utilized. The sleeve 200 also operates to shield the drain 24 from the signal wires 22 so that the signal wires 22 are not shorted. The drain wire 24 grounds the sleeve 200, which in turn grounds the ground pins 302, 308, 314. This defines a constant local ground reference, which helps to provide a matched characteristic impedance between twinax and differential coplanar waveguide, i.e. the attachment area. The controlled geometry of the sleeve 200 ensures that the characteristic impedance of the transmission lines with differing geometries can be matched. That is, the lead frame 100 and sleeve 200 cooperate to maintain the geometry between the wires 22, which in turn maintains the impedance and balance of the wires 22.

The electromagnetic field configuration will not be identical, and there will be a TEM (transverse-electric-magnetic) mode mismatch of minor consequence. The TEM (transverse-electric-magnetic) mode propagation is generally where the electric field and magnetic field vectors are perpendicular to the vector direction of propagation. The cable 20 and pins 300 are designed to carry a TEM propagating signal. The cross-sectional geometry of the cable 20 and the pins 300 are different, therefore the respective TEM field configurations of the cable 20 and the pins 300 are not the same. Thus, the electromagnetic field configurations are not precisely congruent and therefore there is a mismatch in the field configuration. However, if the cable 20 and the pins 300 have the same characteristic impedance, and since they are similar in scale, ground sleeve 200 provides an intermediate characteristic impedance step that is a smooth (geometrically graded) transition between the two dissimilar electromagnetic field configurations. This graded transition ensures a higher degree of match for both even and odd modes of propagation on each differential pair, over a wider range of frequencies when compared to sleeveless termination of just the ground wire. The connector 10 is generally designed to operate as a TEM, or more specifically quasi-TEM transmission line waveguide. TEM describes how the traveling wave in a transmission line has electric field vector, magnetic field vector, and direction of propagation vector orthogonal to each other in space. Thus, the electric and magnetic field vectors will be confined strictly to the cross-section of a uniform cross-section transmission line, orthogonal to the direction of propagation along the transmission line. This is for ideal transmission lines with a uniform cross-section down its length. The "quasi" arises from certain imperfections along the line that are there for ease of manufacturability, like shield holes and abrupt conductor width discontinuities.

The TEM transmission lines can have different geometries but the same characteristic impedance. When two dissimilar transmission lines are joined to form a transition, the field lines in the cross-section don't match identically. The field lines of the electromagnetic field configurations for particular transmission line geometries define a mode shape, or a "mode". So when transmission occurs between dissimilar TEM modes, when the geometries are of similar shape or form and of the same physical scale or order (i.e., between the twinax cable 20 and the connector pins 300), there is some degree of transmission inefficiency. The energy that is not delivered to the second transmission line at a discontinuity may be radiated into space, reflected to the transmission line that it originated from, or be converted into crosstalk interference onto other neighbor transmission lines. This TEM mode mismatch results from the nature of all transmission line discontinuities, because some percentage of the incident propagating energy does not reach the destination transmission line even if they have an identical characteristic impedance.

The transition/termination area is designed so that the mismatch is of little consequence because a negligible amount of the incident signal energy is reflected, radiated, or takes the form of crosstalk interference. The efficiency is maximized by proper configuration of the transition between dissimilar transmission lines. The ground sleeve 200 provides a graded step in geometry between the cable 20 and the pins 300. The configuration is self-defining by the geometrical dimensions of ground sleeve 200 that results in a sufficient (currently, about 110-85 ohms) impedance match between the cable and the pins. During the process of signal propagation along the transition area between two dissimilar transmission line geometries with the same characteristic impedance, most or all of the signal energy is transmitted to the second transmission line, i.e., from the cable 20 to the pins 300, to have high efficiency. The high efficiency generally refers to a high signal transmission efficiency, which means low reflection (which is addressed by a sufficient impedance match).

Referring back to FIG. 1, the ground sleeve 200 is placed over the cables 20 after the cables 20 have been connected to the lead frame 100. The sleeve 200 can abut up against the stop members 142 of the lead frame 100. The wings 222 contact the lead frame 100, and the wings 222 are welded to the outer ground leads 302, 314. Likewise, the center support 224 is welded to the center ground lead 308. The receiving sections 210 of the sleeve 200 surround the termination regions 110, as well as the cables 20. Though welding is used to connect the various leads and wires, any suitable connection can be utilized.

When the sleeve 200 is positioned over the cables 20, each of the wings 222 are aligned with the lands 144, 148 to contact, and electrically connect with, the lands 144, 148. In addition, the sleeve 200 center support 224 contacts, and is electrically connected to, the land 146 of the lead frame 100. The ground pins 302, 308, 314 are grounded by virtue of their connection to the ground sleeve 200, which is grounded by being connected to the drain wire 24.

The ground sleeve 200 operates to control the impedance on the signal wires 20 in the termination region 32. The sleeve 200 confines the electromagnetic field configuration in the termination region to some spatial region. That is, the proximity of the sleeve 200 allows the impedance match to be tuned to the desired impedance. Prior to applying the ground sleeve 200, the bare signal wire ends 34 in this configuration and the entire termination region 32 have a unmatched impedance due to the absence of the conductive foil 28.

In addition, the lead frame 100 and the ground sleeve 200 maintains a predetermined configuration of the signal wires 22 and the drain wire 24. Namely, the lead frame 100 maintains the distance between the signal wires 22, as well as the geometry between the signal wires 22 and the drain wire 24. That geometry minimizes crosstalk and maximizes transmission efficiency and impedance match between the signal wires 22. This is achieved by shielding between cables in the termination area and confining the electromagnetic field configuration to a region in space. The sleeve conductor provides a shield that reduces high frequency crosstalk in the termination area.

Turning to FIG. 5, the wafers 10 are shown in a connection system 5 having a first connector 7 and a second connector 9. The first connector 7 is brought together with the second connector 9 so that the pins 300 of each of the wafers 10 in the first connector 7 mate with respective corresponding contacts in the second connector 9. Each of the wafers 10 are contained within a wafer housing 14, which surrounds the wafers 10 to protect them from being damaged and configures the wafers into a connector assembly.

Each of the wafers 10 are aligned side-by-side with one another within a connector backshell 14. In this arrangement, the ground sleeve 200 operates as a shield. The sleeve 200 shields the signal wires 22 from crosstalk due to the signals on the neighboring cables. This is particularly important since the foil has been removed in the termination region. The sleeve 200 reduces crosstalk between signal lines in the termination region. Without a sleeve 200, crosstalk in a particular application can be over about 10%, which is reduced to substantially less than 1% with the sleeve 200. The sleeve 200 also permits the impedance match to be optimized by confining the electromagnetic field configuration to a region.

Only a bottom portion of the connector housing 14 is shown to illustrate the wafers 10 that are contained within the connector backshell 14. The connector backshell 14 has a top half (not shown), that completely encloses the wafers 10. Since there are multiple wafers 10 within the connector backshell 14, many cables 20 enter the connector backshell 14 in the form of a shielding overbraid 16. After the cables 20 enter the connector backshell 14, each pair of cables 20 enters a wafer 10 and each twinax cable 20 of the pair terminates to the lead frame 100. One specific arrangement of the wafer 10 is illustrated in U.S. Pat. No. 7,753,710, the contents of which are incorporated herein by reference.

The ground sleeve 200 is preferably made of copper alloy so that it is conductive and can shield the signal wires against crosstalk from neighboring wafers. The ground sleeve is approximately 0.004 inches thick, so that the sleeve does not show through the overmold 18. As shown in FIG. 3(*b*), the overmold 18 is injection-molded to cover all of the connector wafer 10 and part of the cable 20 features. The overmold interlocks with the channel 140 as a solid piece down through the twinax cables 20. The overmold 18 prevents cable movement which can influence impedance in undesirable, uncontrolled ways. The channel 140 provides a rigid tether point for the overmold 18. The overmold 18 is a thermoplastic, such as a low-temperature polypropylene, which is formed over the device, preferably from the channel 140 to past the ground sleeve 200. The overmold 18 protects the cable 20 interface with the lead frame 100 and provides strain relief. The overmold 18 encloses the channel 140 from the top and bottom and enters the openings in the channel 140 to bind to itself. While the overmold 18 generally prevents movement, the channel 140 feature provides additional immunity to movement.

The approximate length and width of the sleeve are 0.23 inches and 0.27 inches, respectively, for a cable 20 having insulated signal wires with a diameter of about 1.34 mm. Ground sleeve 200 provides improved odd and even mode matching for cable termination. As an illustrative example not intended to limit the invention or the claims, the improvement in odd and even mode impedance matching can be observed in terms of increased odd and even mode transmission in FIGS. 4(*b*) and 4(*c*) respectively, or in terms of reduced odd and even mode reflection in FIGS. 4(*d*) and 4(*e*) respectively. It is readily apparent from FIGS. 4(*b*) and 4(*c*) that both the odd mode and even mode transmission efficiency is significantly improved when the ground sleeve 200 is employed. Similarly with odd and even mode reflection, in FIGS. 4(*d*) and 4(*e*) respectively, the use of ground sleeve 200 results in substantial reduction in magnitude of reflection due to the termination region. As shown in FIG. 4(*f*), a further benefit of the geometrical symmetry inherent to ground sleeve 200 is the substantial reduction in transmitted signal energy which is converted from the preferred mode of operation (odd mode) to a less preferable mode of propagation (even mode) to which a portion of useful signal energy is lost. Of course, other ranges may be achieved depending on the specific application.

Though two twinax cables 20 are shown in the illustrative embodiments of the invention, each having two signal wires 22, any suitable number of cables 20 and wires 22 can be utilized. For instance, a single cable 20 having a single wire 22 can be provided, which would be referred to as a signal ended configuration. A single-ended cable transmission line is a signal conductor with an associated ground conductor (more appropriately called a return path). Such a ground conductor may take the form of a wire, a coaxial braid, a conductive foil with drain wire, etc. The transmission line has its own ground or shares a ground with other single-ended signal wires. If a one-wire cable such as coaxial cable is used, the outer shield of this transmission line is captivated and an electrical connection is made between it and the single-ended connector's ground/return/reference conductor(s). A twisted pair transmission line inherently has a one-wire for the signal and is wrapped in a helix shape with a ground wire (i.e., they are both helixes and are intertwined to form a twisted pair). There are other one-wire or single-ended types of transmission lines than coax and twisted pairs, for example the Gore QUAD™ product line is an example of exotic high performance cabling. Or, there can be a single cable 20 having four wires 22 forming two differential pairs.

As shown in FIGS. 1-5, the preferred embodiment connects a cable 20 to leads 300 at the lead frame 100. However, it should be apparent that the sleeve 200 can be adapted for use with a lead frame that is attached to a printed circuit board (PCB) instead of a cable 20. In that embodiment, there is no cable 20, but instead leads from the board are covered by the ground sleeve. Thus, the ground sleeve would common together the ground pins of the lead frame. The ground sleeve can provide a direct or indirect conductive path to the board through leads attached to the sleeve or integrated with the sleeve.

Figure 6:
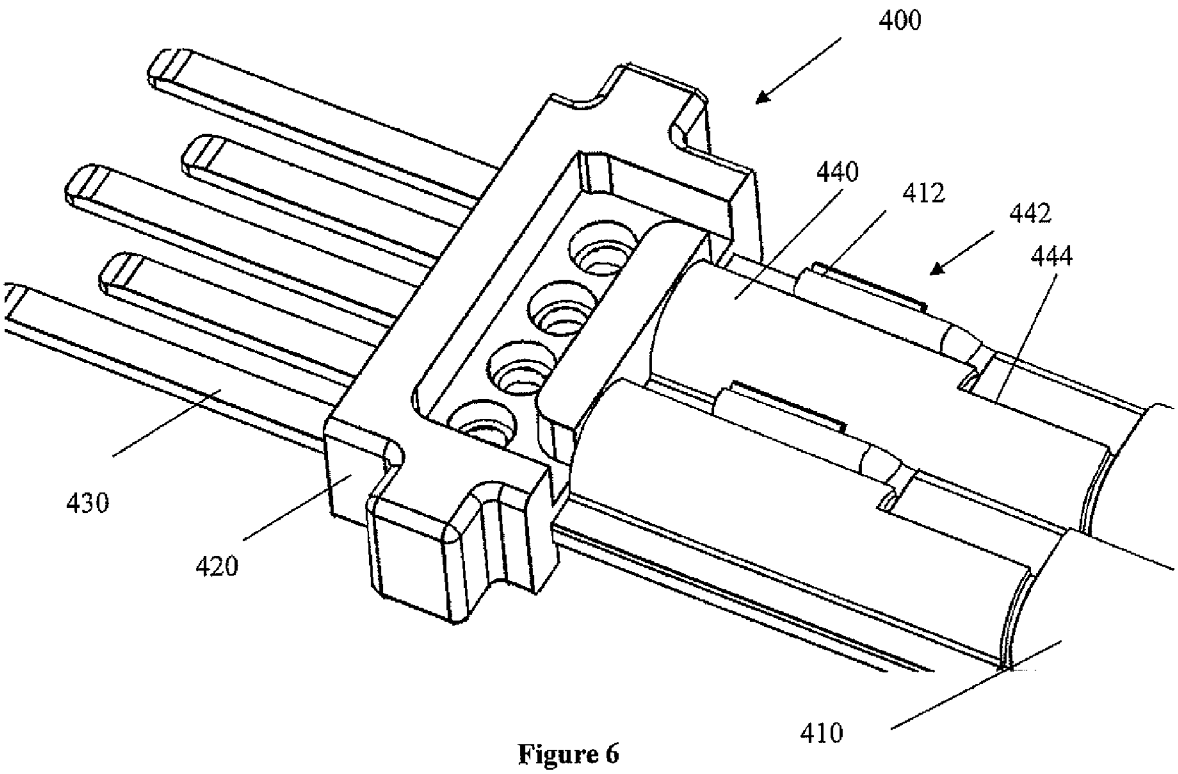
FIGS. 6-9 show an alternative embodiment of the invention in which the ground sleeve has a side pocket for connecting two single-wire coaxial cables.
Figure 7:
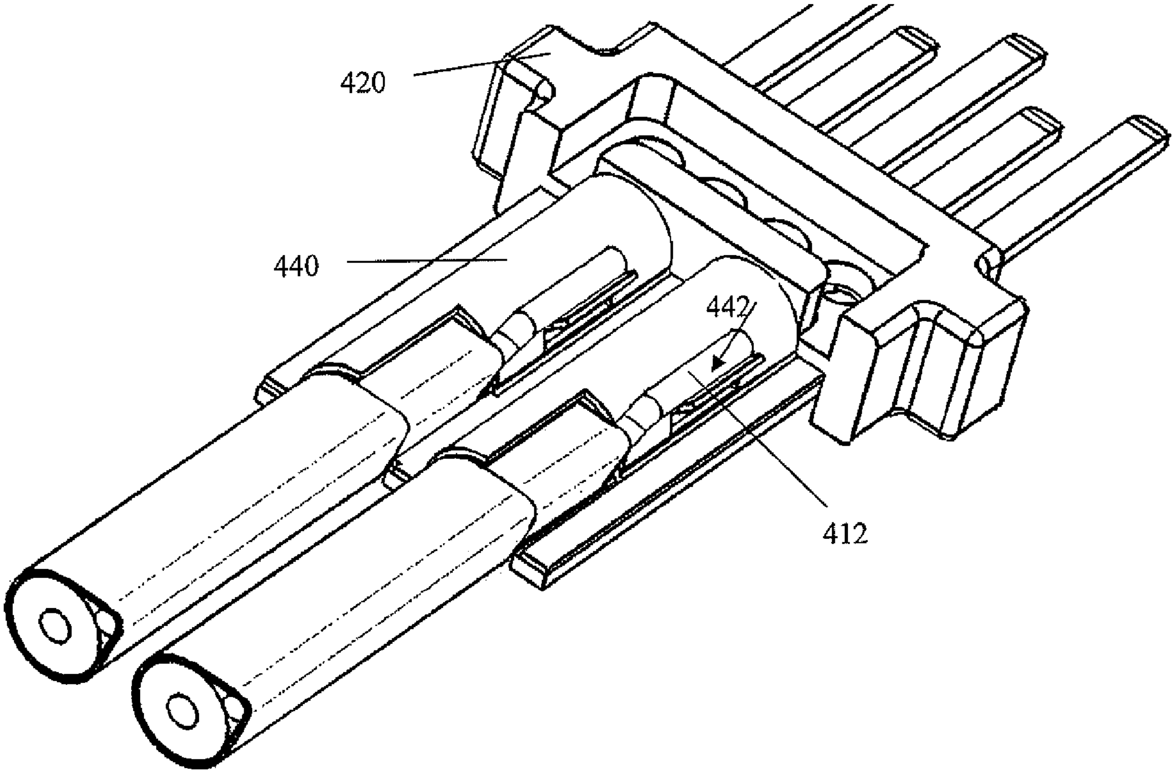
Figure 8:
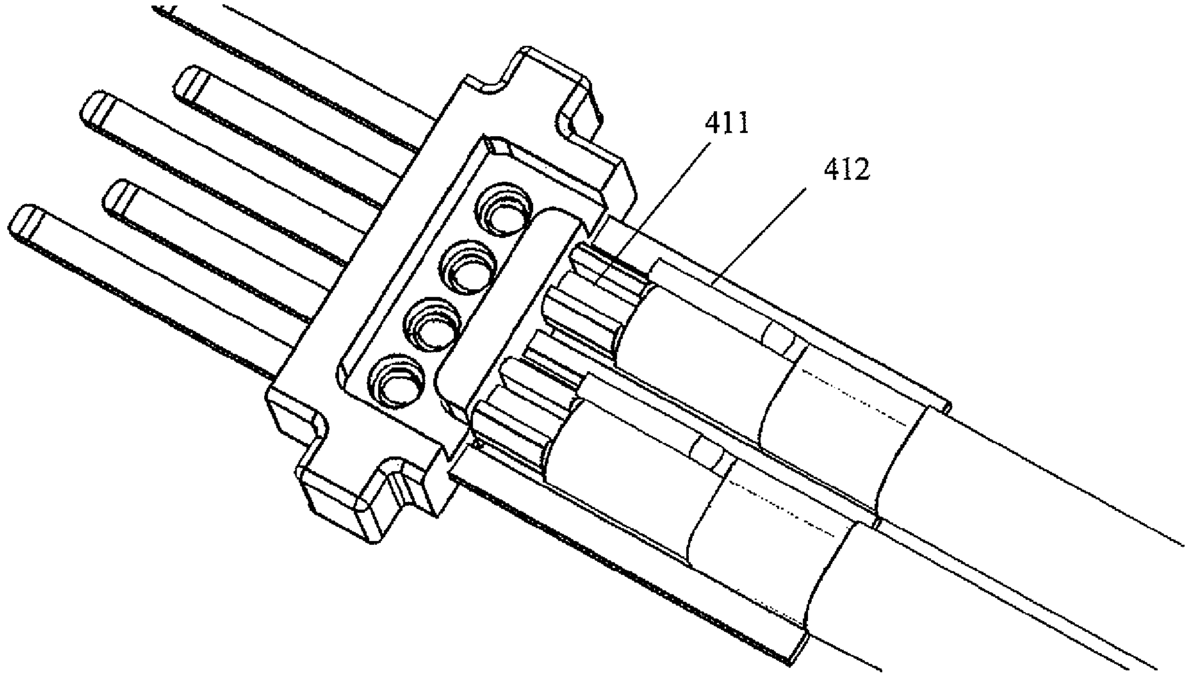

Another embodiment of the invention is shown in FIGS. 6-11. This embodiment is used for connecting two single-wire coaxial cables 410 to leads 430 at a lead frame 420. Accordingly, the features of the connector 400 that are analogous to the same features of the earlier embodiment, are discussed above with respect to FIGS. 1-5. Turning to FIGS. 6 and 7, the connector wafer 400 is shown connecting the two single-cable coaxial wires 410 to the leads 430 at a lead frame 420. A ground sleeve 440 covers the termination region of the cable 410. As best shown in FIG. 8, the cables 410 each have a signal conductor and a ground or drain wire 412 wrapped by conductive foil and insulation.

Figure 9:
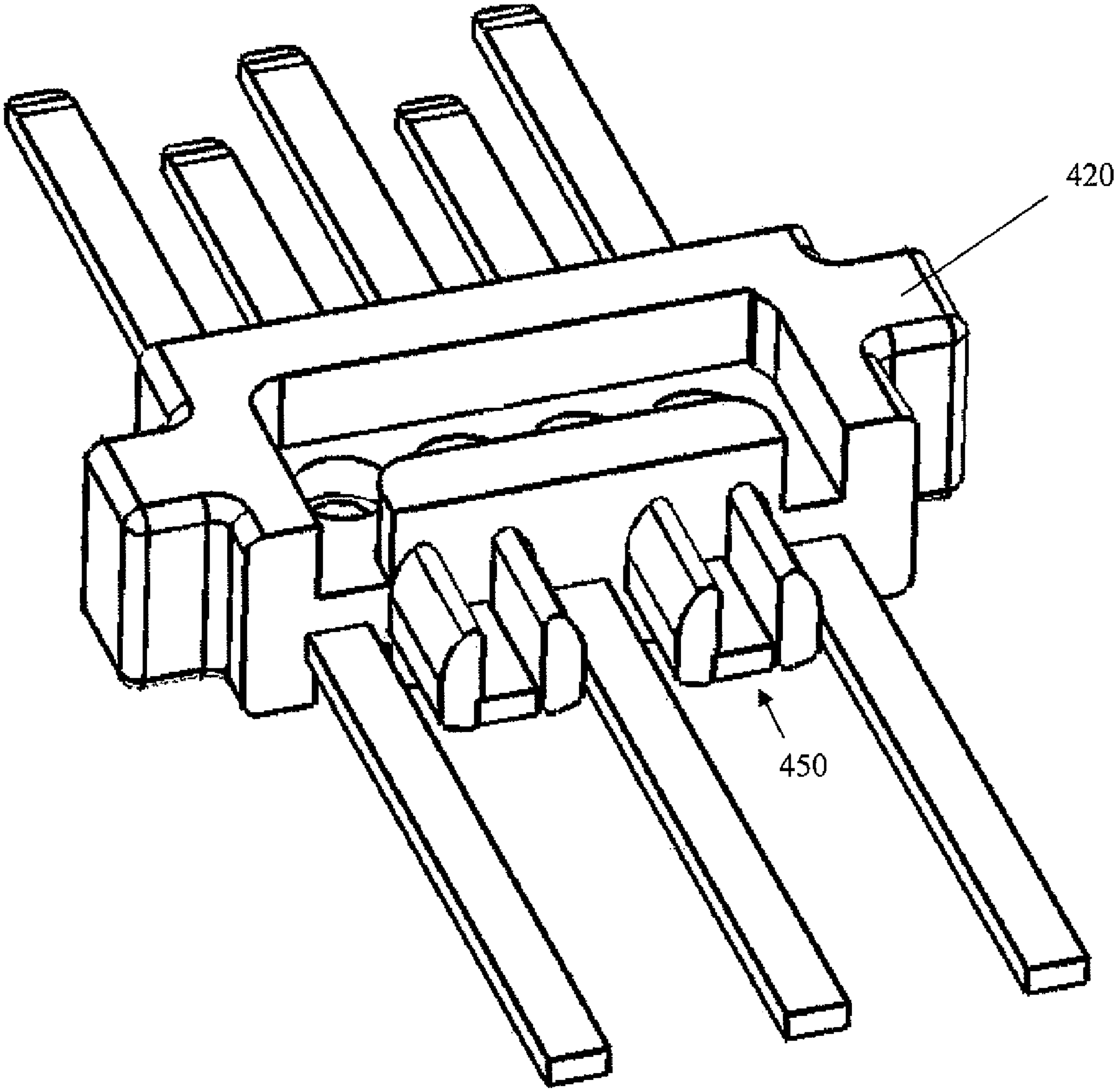

Returning to FIGS. 6-7, the ground wire 412 extends up along the side of the ground sleeve 440 and rests in a side pocket 442 located on the curved portion of the ground sleeve 440, which is along the side of the ground sleeve 440. Referring to FIG. 9, the lead frame 420 is shown. Because each cable 410 has a single signal conductor, each mating portion only has a single receiving section 450 and does not have a center divider.

Figure 10:
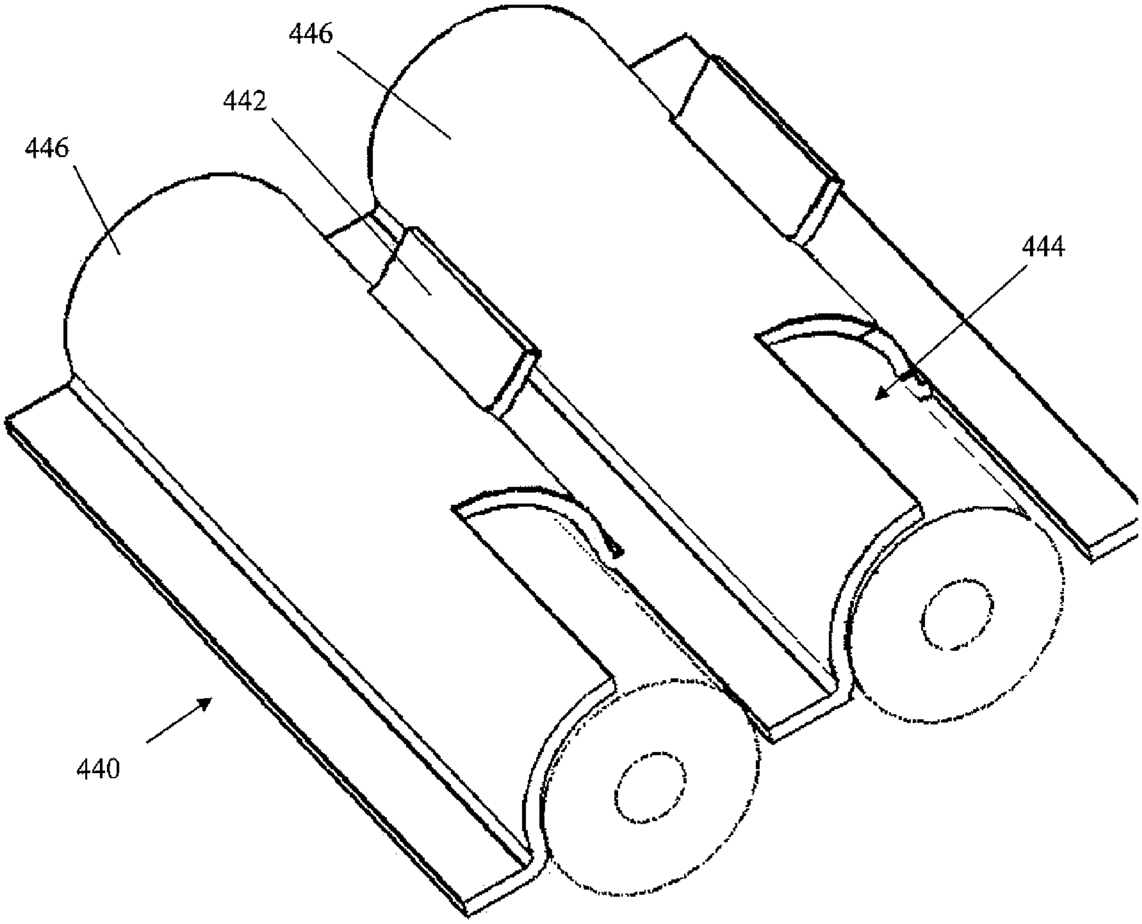
FIGS. 10-11 show the ground sleeve in accordance with the alternative embodiment of FIGS. 6-9.
Figure 11:
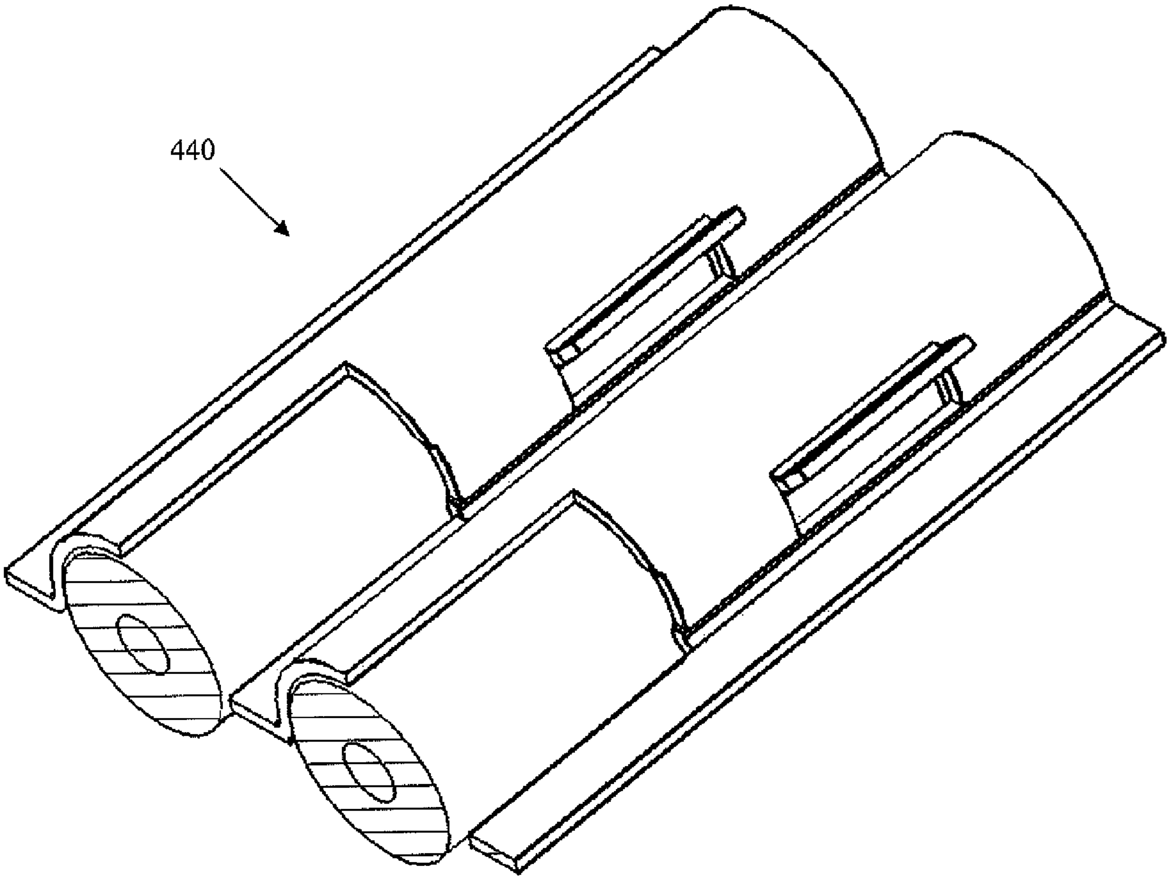

The ground sleeve 440 is shown in greater detail in FIGS. 10 and 11. The ground sleeve 440 has two curved portions 446. Each of the curved portions 446 receive one of the cables 410 and substantially cover the top half of the received cable 410. Instead of the trough 216 of FIG. 4(*a*), the ground sleeve 440 has a side pocket 442 that is formed by being stamped out of and bent upward from one side of each curved portion 446. The side pocket 442 receives the drain wire 412 and connects the drain wire 412 to the ground leads 430 via the wings and center support of the ground sleeve 440. In addition, a side portion 444 of the curved portion 446 is cut out. The cutout 444 provides a window for the drain wire 412 to pass through the ground sleeve 440.

Figure 12:
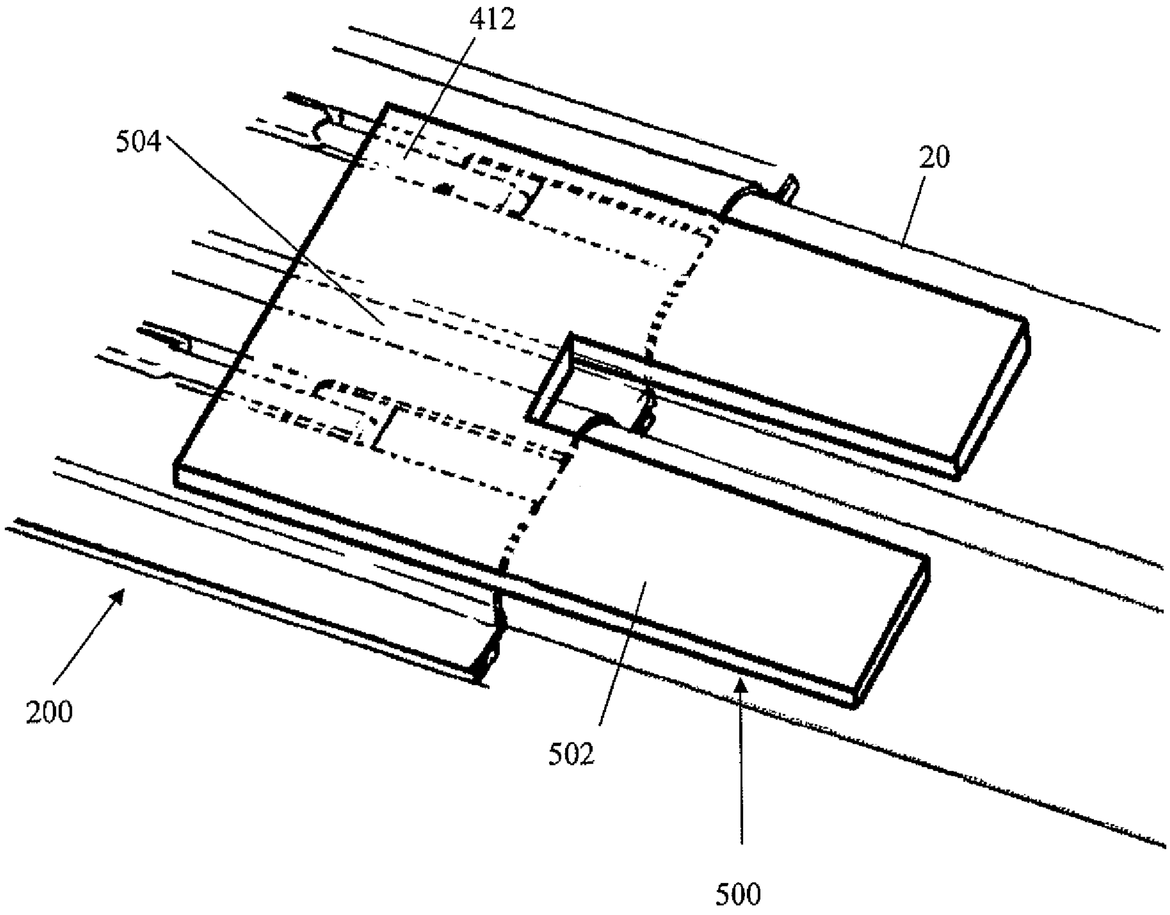
FIGS. 12-14 show a conductive slab utilized with the ground sleeve.
Figure 13:
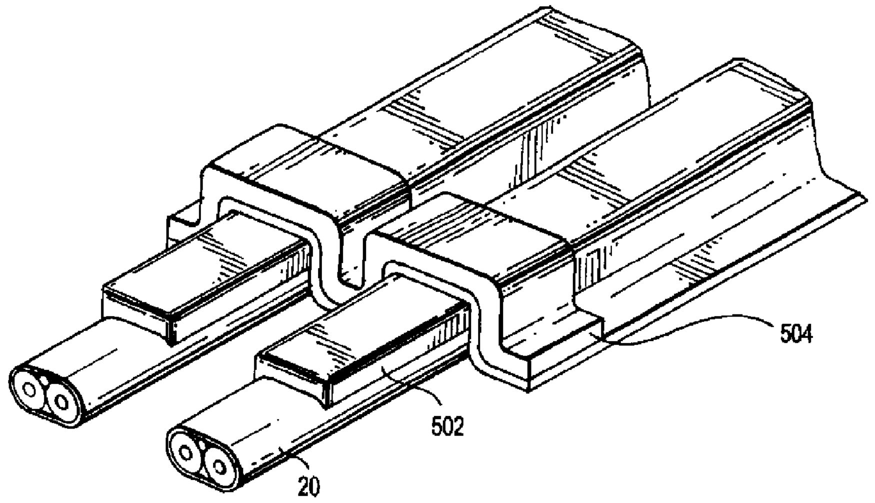
Figure 14:
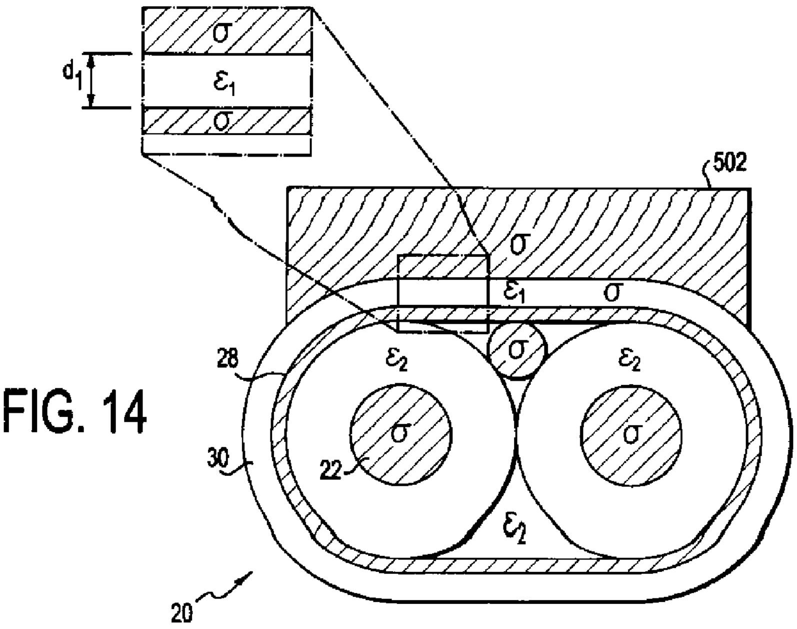

Turning to FIGS. 12-14, an alternative feature of the present invention is shown. In the present embodiment, a conductive elastomer electrode slab 500 is provided. The slab 500 essentially comprises a relatively flat member that is formed over the surface of the sleeve 200 and cable 20. The slab 500 has two rectangular leg portions 502 joined together at one end by a center support portion 504 to form a general elongated U-shape. The slab 500 can be a conductive elastomer, epoxy, or other polymer so that it can be conformed to the contour of the cable. Though the slab 500 is shown as being relatively flat in the embodiment of FIGS. 12-14, it is slightly curved to match the contour of the cable 20. The elastomer, epoxy or polymer is impregnated with a high percentage of conductive particles. The slab 500 can also be a metal, such as a copper foil, though preferably should be able to conform to the contour of the cable 20 or is tightly wrapped about the cable 20. The slab 500 is affixed to the top of the ground sleeve 200 and the cables 20, such as by epoxy, conductive adhesive, soldering or welding.

The center support portion or connecting member 504 generally extends over the sleeve 200 and the legs 502 extend from the sleeve 200 over the cable 20. The connecting member 504 allows for ease of handling since the slab 500 is one piece. The connection 504 (FIG. 12) acts as a shield for small leakage fields at small holes and gaps between the openings 218 (FIG. 4(*a*)) and the drain wire 24 (FIG. 2).

The slab 500 contacts and electrically conducts with the ground wires 412 of the cable 20. It preserves the continuity of the cable 20 ground return 412 through the insulative jacketing of the cable. The jacket insulator provides for a capacitor dielectric substrate between the slab 500 electrode and the cable conductor shield foil 28 surface. A capacitive coupling is formed between the slab leg 502, which forms one electrode of a capacitor, and the cable shield conductor foil 28, which forms the second electrode of the capacitor. The enhanced capacitive coupling at high frequencies (i.e., greater than 500 MHz) electrically "commons" the cable shield foil 28, where physical electrical contact is essentially impossible or impractical. The protective insulator remains unaltered to preserve the mechanical integrity of the fragile cable shield conductor foil 28. Exposing the very thin cable conductor foil 28 for conductive contact is impractical in that it requires much physical reinforcement, or may be impossible because the cable shield conductor foil 28 may be too thin and fragile to make contact with slab 502 if cable shield conductor foil 28 is a sputtered metal layer inside the protective insulator jacket 30.

With reference to FIG. 14, it is desirable to have a low impedance to provide improved shielding because the slab 500 is more reflective. The low impedance can be obtained by increasing the capacitance and/or the dielectric constant. However, the capacitance is limited by the amount of surface area available on the cable 20 for a given application. The conductive properties of the slab should be as conductive as possible (conductivity of metal). For instance, the impedance of the series capacitive section between leg 502 and cable outer conductor 28 should be less than 0.50 ohms at frequencies greater than 500 MHz. The impedance can only get smaller as the operational frequency increases, assuming that capacitance remains constant. And, the dielectric constant is limited by the materials available for use, the capacitance can be enhanced by using high dielectric constant materials.

The size of the slab 500 or slab leg 502 can be varied to adjust the capacitor surface area and therefore adjust the capacitance. Generally the slab 500 and leg 502 should be as conductive as possible since they form one electrode of the enhanced capacitive area. The capacitance is dependent upon the dimensions of the application, the permittivity characteristics of the insulator material the cable protective jacket is made out of, and the operational frequency for the application. In general terms, the impedance of the ground return current at and above the desired operational frequency should be less than 1 ohm in magnitude. A simple parallel plate capacitor has a capacitance of:

$$C = \frac{\varepsilon_r \varepsilon_0 A}{d}$$

Where C represents the capacitance between the leg 502 and the foil 28, $\in_0$ is the permittivity of vacuum, $\in_r$ is the relative permittivity of the capacitor dielectric medium, A is the parallel plate capacitor surface area (i.e., leg 502), and d is the separation distance between the plate surfaces.

The impedance magnitude (|Z|) of a parallel plate capacitor (between the leg 502 and foil 28) is:

$$|Z| = \frac{1}{2\pi \cdot f \cdot C}$$

Where f is the frequency in Hertz and C is the capacitance.

For one example at 500 MHz, the length of slab leg 502 would be 0.2 inches and 0.1 inches in width, which forms a capacitor area of 0.02 square inches. The thickness d of a typical cable protective jacket is about 0.0025 inches thick and has a typical relative dielectric constant $\in_r$, of 4. The capacitance of this specific element is approximately 730 pF. At 500 MHz, the impedance magnitude of this element is:

$$|Z| = \frac{1}{2\pi \cdot 500 \cdot 10^6\ \text{Hz} \cdot 730\ \text{pF}} = 0.43\ \Omega$$

For frequencies above 500 MHz, this impedance will be reduced accordingly for this example.

An ideal capacitor provides a smaller path impedance as the operating frequency of the signal increases. So, increasing capacitance in alternating current signal (or in this case, the ground return) current paths provides an electrical short between conductor surfaces. Though the size and capacitance could vary greatly, it is noted for example that if the geometry in the cross section of ground sleeve 200 over the cable was kept constant and extruded by twice the length, the capacitance would be approximately doubled and the impedance of that element would be approximately half. Thus, because the capacitive coupling is enhanced to a great degree, it is not necessary for the shield 500 to make physical contact with the cable shield foil 28 while still being able to provide adequately low impedance return current path, i.e. the conductors may be separated by a thin insulating membrane. In fact, the thinner the insulating membrane, the larger the capacitance will be and therefore lower impedance path for the ground return current.

The slab 500 also improves crosstalk performance due to greater shielding around the termination area, where the enhanced capacitive coupling maintains high frequency signal continuity, and leakage currents are suppressed from propagating on the outside of the signal cable shield conductor. Since the enhanced capacitance provides a low impedance short-circuit impedance path, the return currents are less susceptible to become leakage currents on the cable shield foil 28 exterior, which can become spurious radiation and cause interference to electronic equipment in the vicinity. The shield 500 also eliminates resonant structures in the connector ground shield by commoning the metal together electrically. The slab 500 provides a short circuit to suppress resonance between geometrical structures on ground sleeve 200 that may otherwise be resonant at some frequencies. The end result of applying the slab 500 is the creation of an electrically uniform conductor consisting of several materials (conductive slab and ground sleeve 200).

As shown in FIG. 13, the slab 500 can be a flexible elastomer, which has the benefit of maintaining electrical conductivity while still allowing the cable 20 to have greater flexible mechanical mobility than a rigid conductive element provides. This flexibility is in terms of mechanical elasticity, so that the entire joint has some degree of play if the cable 20 needed to bend at the joint of ground sleeve 200 and the cable 20 for some reason or specific application, before the area is overmolded. Since the conductive elastomer/epoxy is applied in a plastic or liquid uncured state, it follows the contour of the cable protective insulator jacket to provide greater connection to sleeve 200 in ways that are difficult to achieve with a foil. Since the foil isn't able to conform to the surface contours of the ground sleeve 200 as well as with conductive elastomer/epoxy, and the foil realizes excess capacitance over the elastomer/epoxy.

Though the slab 500 has been described and shown as a relatively thin and flat U-shaped member that is formed of a single piece, it can have other suitable sizes and shapes depending on the application. For instance, the slab 500 can be one or more rectangular slab members (similar to the legs 502, but without the connecting member 504), one of more of which are positioned over each signal conductor of the cable 20.

The slab 500 is preferably used with the sleeve 200. The sleeve 200 provides a rigid surface to which the slab 500 can be connected without becoming detached. In addition, the sleeve 200 is a rigid conductor that controls the transmission line characteristic impedance in the termination area. The ground sleeve 200 also provides an electrical conduction between the connector ground pins 144, 146, 148, drain wire 24, and eventually conductor foil 28. In addition, the slab 500 and the sleeve 200 could be united as a single piece, though the surface conformity over the cables 20 would have to be very good. By having the slab 500 and the sleeve 200 separate, the slab 500 and the sleeve 200 can better conform to the surface of the cables 20. However, the slab 500 can also be used without the sleeve 200, as long as the area over which the slab 500 is used is sufficiently rigid, or the slab 500 sufficiently flexible, so that the slab 500 does not detract.

It is further noted that the sleeve 200 can be extended farther back along the cable 20 in order to enhance the capacitance. In other words, the sleeve 200 may have stamped metal legs as part of sleeve 200 that are similar to legs 502. However, the capacitance would be inferior to the use of the slab 500 with legs 502 because the legs 502 are more flexible and therefore better conformed to the insulating jacket 30 surface area and are therefore as close as physically possible to the foil 28. Thus, the series capacitance C is higher than would be the case with an extended sleeve 200

The legs 502 further enhances the electrical connection to the metalized mylar jacket of the cable 20. The slab 500 is preferably utilized with the H-shaped configuration of the sleeve 200. The slab 500 functions to short the two curved portions 212, 214 of the sleeve 200 to prevent electrical stubbing. The H-shaped configuration of the sleeve 200 is easier to manufacture and assemble as compared to the use of a round hole as an opening 218.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A sleeve for use with a first wire, a second wire, and a ground wire, the first and second wires each being at least partially encased in an insulation to define a bare wire section and an insulated wire section, the sleeve comprising:

a first elongated portion having a cross-section with a shape that conforms with a shape of the insulated wire section of the first wire so that said first elongated portion covers the bare wire section of said first wire and at least a portion of the insulated wire section of the first wire, a second elongated portion having a cross-section with a shape that conforms with a shape of the insulated wire section of the second wire so that said second elongated portion covers the bare wire section of said second wire and at least a portion of the insulated wires section of said second wire, the second elongated portion extending substantially parallel to said first elongated portion, and a cross-member connecting said first elongated portion with said second elongated portion, wherein said first elongated portion, second elongated portion and cross-member are a single piece member, wherein said sleeve is electrically connected to the ground wire.

2. The sleeve of claim 1, further comprising a first wing connected with the first elongated portion and a second wing connected with the second elongated portion.

3. The sleeve of claim 2, wherein the first and second elongated portions are disposed between the first and second wings.

4. The sleeve of claim 2, wherein the first and second wings are relatively flat and coplanar with one another.

5. The sleeve of claim 1, wherein a top surface of said cross-support member is connected to the ground wire.

6. The sleeve of claim 1, wherein the shape of said first and second elongated portions are each curved and the cross-member is inversely curved with respect to the shape of said first and second elongated portions.

7. The sleeve of claim 1, wherein the shapes of said first and second elongated portions are each approximately a quarter of a circle.

8. The sleeve of claim 1, wherein said first elongated portion that covers the bare wire section of the first wire shields the bare wire section of the first wire and said second elongated portion that covers the bare wire section of the second wire shields the bare wire section of the second wire.

9. The sleeve of claim 1, wherein the insulated sections of the first and second wires are partially encased within a conductive foil to define a shielded insulated wire section and an unshielded insulated wire section, and wherein said sleeve controls the impedance of the first and second wires at the bare wire sections and the unshielded insulated wire sections of the first and second wires.

10. The sleeve of claim 1, said sleeve having a sleeve surface and the insulated wire section having an insulated wire section surface, and further comprising a conductive member formed over the sleeve surface and the insulated wire section surface.

11. The sleeve of claim 10, wherein a conductive foil is formed between each of the first and second wires and the insulation, said conductive member forming a capacitive coupling with the conductive foil.

12. The sleeve of claim 10, wherein said conductive member has a first leg, a second leg, and a support member connecting the first leg and the second leg.

13. The sleeve of claim 10, wherein said conductive member comprises an elastomer, epoxy or polymer.

14. The sleeve of claim 13, wherein said elastomer, epoxy or polymer has conductive particles embedded therein.

15. The sleeve of claim 1, wherein said sleeve is conductive.

16. The sleeve of claim 1, wherein said sleeve shields the first and second wires from or to crosstalk.

17. A sleeve for use with a first wire and a second wire, the first and second wires each being at least partially encased in an insulation to define a bare wire section and an insulated wire section, the sleeve comprising:

a first elongated portion having a cross-section with a curved shape that conforms with a shape of the insulated wire section of the first wire so that said first elongated portion covers the bare wire section of said first wire and at least a portion of the insulated wire section of the first wire, a second elongated portion having a cross-section with a curved shape that conforms with a shape of the insulated wire section of the second wire so that said second elongated portion covers the bare wire section of said second wire and at least a portion of the insulated wires section of said second wire, the second elongated portion extending substantially parallel to said first elongated portion, and a cross-member connecting said first elongated portion with said second elongated portion, wherein said first elongated portion, second elongated portion and cross-member are a single piece member and said cross-member is inversely curved with respect to the curved shape of said first and second elongated portions.

18. The sleeve of claim 17, wherein said sleeve shields from or against crosstalk.

19. The sleeve of claim 17, further comprising a first wing connected with the first elongated portion and a second wing connected with the second elongated portion.

20. The sleeve of claim 19, wherein the first and second elongated portions are disposed between the first and second wings.

21. The sleeve of claim 19, wherein the first and second wings are relatively flat and coplanar with one another.

22. The sleeve of claim 17, wherein the shapes of said first and second elongated portions are each approximately a quarter of a circle.

23. The sleeve of claim 17, wherein said first elongated portion that covers the bare wire section of the first wire shields the bare wire section of the first wire and said second elongated portion that covers the bare wire section of the second wire shields the bare wire section of the second wire.

24. The sleeve of claim 17, wherein said sleeve shields the first and second wires from or to crosstalk.

25. The sleeve of claim 17, wherein said sleeve is conductive.

26. A sleeve for use with a first wire and a second wire, the first and second wires each being at least partially encased in an insulation to define a bare wire section and an insulated wire section, the sleeve comprising:

a first elongated portion having a cross-section with a shape that is approximately a quarter of a circle and conforms with a shape of the insulated wire section of the first wire so that said first elongated portion covers the bare wire section of said first wire and at least a portion of the insulated wire section of the first wire, a second elongated portion having a cross-section with a shape that is approximately a quarter of a circle and conforms with a shape of the insulated wire section of the second wire so that said second elongated portion covers the bare wire section of said second wire and at least a portion of the insulated wires section of said second wire, the second elongated portion extending substantially parallel to said first elongated portion, and a cross-member connecting said first elongated portion with said second elongated portion, wherein said first elongated portion, second elongated portion and cross-member are a single piece member.

27. The sleeve of claim 26, further comprising a first wing connected with the first elongated portion and a second wing connected with the second elongated portion.

28. The sleeve of claim 27, wherein the first and second elongated portions are disposed between the first and second wings.

29. The sleeve of claim 27, wherein the first and second wings are relatively flat and coplanar with one another.

30. The sleeve of claim 26, wherein a top surface of said cross-support member is connected to the ground wire.

31. The sleeve of claim 26, wherein the shape of said first and second elongated portions are each curved and the cross-member is inversely curved with respect to the shape of said first and second elongated portions.

32. The sleeve of claim 26, said sleeve having a sleeve surface and the insulated wire section having an insulated wire section surface, and further comprising a conductive member formed over the sleeve surface and the insulated wire section surface.

33. The sleeve of claim 32, wherein a conductive foil is formed between each of the first and second wires and the insulation, said conductive member forming a capacitive coupling with the conductive foil.

34. The sleeve of claim 32, wherein said conductive member has a first leg, a second leg, and a support member connecting the first leg and the second leg.

35. The sleeve of claim 32, wherein said conductive member comprises an elastomer, epoxy or polymer.

36. The sleeve of claim 35, wherein said elastomer, epoxy or polymer has conductive particles embedded therein.

37. The sleeve of claim 26, wherein said first elongated portion that covers the bare wire section of the first wire shields the bare wire section of the first wire and said second elongated portion that covers the bare wire section of the second wire shields the bare wire section of the second wire.

38. The sleeve of claim 26, wherein said sleeve is conductive.

39. The sleeve of claim 26, wherein said sleeve shields the first and second wires from or to crosstalk.

40. A sleeve for use with a first wire and a second wire, the first and second wires each being at least partially encased in an insulation to define a bare wire section and an insulated wire section, the sleeve comprising:

a first elongated portion having a cross-section with a shape that conforms with a shape of the insulated wire section of the first wire so that said first elongated portion covers the bare wire section of said first wire and at least a portion of the insulated wire section of the first wire, a second elongated portion having a cross-section with a shape that conforms with a shape of the insulated wire section of the second wire so that said second elongated portion covers the bare wire section of said second wire and at least a portion of the insulated wires section of said second wire, the second elongated portion extending substantially parallel to said first elongated portion, and a cross-member connecting said first elongated portion with said second elongated portion, wherein said first elongated portion, second elongated portion and cross-member are a single piece member, wherein the insulated sections of the first and second wires are partially encased within a conductive foil to define a shielded insulated wire section and an unshielded insulated wire section, and said sleeve controls the impedance of the first and second wires at the bare wire sections and the unshielded insulated wire sections of the first and second wires.

41. The sleeve of claim 40, further comprising a first wing connected with the first elongated portion and a second wing connected with the second elongated portion.

42. The sleeve of claim 41, wherein the first and second elongated portions are disposed between the first and second wings.

43. The sleeve of claim 41, wherein the first and second wings are relatively flat and coplanar with one another.

44. The sleeve of claim 40, wherein a top surface of said cross-support member is connected to the ground wire.

45. The sleeve of claim 40, wherein the shape of said first and second elongated portions are each curved and the cross-member is inversely curved with respect to the shape of said first and second elongated portions.

46. The sleeve of claim 40, wherein the shapes of said first and second elongated portions are each approximately a quarter of a circle.

47. The sleeve of claim 40, said sleeve having a sleeve surface and the insulated wire section having an insulated wire section surface, and further comprising a conductive member formed over the sleeve surface and the insulated wire section surface.

48. The sleeve of claim 47, wherein a conductive foil is formed between each of the first and second wires and the insulation, said conductive member forming a capacitive coupling with the conductive foil.

49. The sleeve of claim 47, wherein said conductive member has a first leg, a second leg, and a support member connecting the first leg and the second leg.

50. The sleeve of claim 47, wherein said conductive member comprises an elastomer, epoxy or polymer.

51. The sleeve of claim 50, wherein said elastomer, epoxy or polymer has conductive particles embedded therein.

52. The sleeve of claim 40, wherein said first elongated portion that covers the bare wire section of the first wire shields the bare wire section of the first wire and said second elongated portion that covers the bare wire section of the second wire shields the bare wire section of the second wire.

53. The sleeve of claim 40, wherein said sleeve is conductive.

54. The sleeve of claim 40, wherein said sleeve shields the first and second wires from or to crosstalk.

55. A sleeve for use with a first wire and a second wire, the first and second wires each being at least partially encased in an insulation to define a bare wire section and an insulated wire section, the sleeve comprising:

a first elongated portion having a cross-section with a shape that conforms with a shape of the insulated wire section of the first wire so that said first elongated portion covers the bare wire section of said first wire and at least a portion of the insulated wire section of the first wire, a second elongated portion having a cross-section with a shape that conforms with a shape of the insulated wire section of the second wire so that said second elongated portion covers the bare wire section of said second wire and at least a portion of the insulated wires section of said second wire, the second elongated portion extending substantially parallel to said first elongated portion, and a cross-member connecting said first elongated portion with said second elongated portion, wherein said first elongated portion, second elongated portion and cross-member are a single piece member, said sleeve having a sleeve surface and the insulated wire section having an insulated wire section surface, and further comprising a conductive member formed over the sleeve surface and the insulated wire section surface.

56. The sleeve of claim 55, further comprising a first wing connected with the first elongated portion and a second wing connected with the second elongated portion.

57. The sleeve of claim 56, wherein the first and second elongated portions are disposed between the first and second wings.

58. The sleeve of claim 56, wherein said first elongated portion that covers the bare wire section of the first wire shields the bare wire section of the first wire and said second elongated portion that covers the bare wire section of the second wire shields the bare wire section of the second wire.

59. The sleeve of claim 55, wherein said sleeve is conductive.

60. The sleeve of claim 55, wherein said sleeve shields the first and second wires from or to crosstalk.

61. The sleeve of claim 55, wherein a top surface of said cross-support member is connected to the ground wire.

62. The sleeve of claim 55, wherein the shape of said first and second elongated portions are each curved and the cross-member is inversely curved with respect to the shape of said first and second elongated portions.

63. The sleeve of claim 55, wherein a conductive foil is formed between each of the first and second wires and the insulation, said conductive member forming a capacitive coupling with the conductive foil.

64. The sleeve of claim 55, wherein said conductive member has a first leg, a second leg, and a support member connecting the first leg and the second leg.

65. The sleeve of claim 55, wherein said conductive member comprises an elastomer, epoxy or polymer.

66. The sleeve of claim 65, wherein said elastomer, epoxy or polymer has conductive particles embedded therein.

* * * * *

UNITED STATES PATENT AND TRADEMARK OFFICE

CERTIFICATE OF CORRECTION

PATENT NO. : 7,906,730 B2
APPLICATION NO. : 12/240577
DATED : March 15, 2011
INVENTOR(S) : Prescott Atkinson et al.

It is certified that error appears in the above-identified patent and that said Letters Patent is hereby corrected as shown below:

<u>In the specification:</u>

At column 3, lines 27-43, delete the following paragraph:
"Referring to FIG. 2, the cables 20 are shown in greater detail. In the embodiment shown, two twin-axial cables, or twinax, are provided. Each of the cables 20 have two signal wires 22 which form a differential pair, and a drain wire 24 which maintains a ground reference with the cable conductive foil 28. The signal wires 22 are each separately surrounded by an insulated protective coating 26. The insulated wire pairs 22 and the non-insulated drain wire 24 are encased together in a conductive foil 28, such as an aluminized Mylar, which shields the wires 22 from neighboring cables 20 and other external influences. The foil 28 also controls the impedance of the cables 20 by binding the cross sectional electromagnetic field configuration to a spatial region. Thus, the twinax cables 20 provide a shielded signal pair within a conformal shield. A plastic jacket 30 surrounds the conductive foil 28 to protect the wires 22, which may be thin and fragile, from being damaged."

At column 3, line 27, insert the following paragraph:
--The structure of the lead frame 100 is best shown in FIG. 3(*a*). The lead frame 100 has two termination land regions 110. Each termination region 110 is configured to terminate one of the twinax cables 20 to their respective lands 130,132,134,136. Accordingly, each termination region 110 has an H-shaped center divider 112 formed by two substantially parallel legs 114, 116 and a center bridge 118 substantially perpendicular to the legs 114, 116 to provide a cross support therebetween. Air cavities 120 are formed at the bottom and top of the center divider 112 between the leg members 114, 116. --

Signed and Sealed this
First Day of October, 2013

Teresa Stanek Rea
*Deputy Director of the United States Patent and Trademark Office*